(12) United States Patent
Srinivasan

(10) Patent No.: US 7,499,495 B2
(45) Date of Patent: Mar. 3, 2009

(54) EXTENDED RANGE MOTION VECTORS

(75) Inventor: Sridhar Srinivasan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 10/893,703

(22) Filed: Jul. 16, 2004

(65) Prior Publication Data

US 2005/0013372 A1    Jan. 20, 2005

Related U.S. Application Data

(63) Continuation-in-part of application No. 10/622,841, filed on Jul. 18, 2003.

(60) Provisional application No. 60/488,710, filed on Jul. 18, 2003.

(51) Int. Cl.
H04N 7/12 (2006.01)
H04N 7/137 (2006.01)

(52) U.S. Cl. .............. 375/240.16; 348/416; 375/240.12

(58) Field of Classification Search ................. 348/699, 348/413, 416, 402, 700, 701, 415, 409, 401, 348/400, 390, 384, 412, 410, 419; 382/232, 382/236, 239; 375/240.16, 240.12, 240.24, 375/240.27, 240.28, 240.01, 240.26, 240.23, 375/240.03, 240.17
See application file for complete search history.

(56) References Cited

U.S. PATENT DOCUMENTS

| | | |
|---|---|---|
| 4,454,546 A | 6/1984 | Mori |
| 4,661,849 A | 4/1987 | Hinman |
| 4,661,853 A | 4/1987 | Roeder et al. |
| 4,691,329 A | 9/1987 | Juri et al. |
| 4,695,882 A | 9/1987 | Wada et al. |
| 4,796,087 A | 1/1989 | Guichard et al. |
| 4,800,432 A | 1/1989 | Barnett et al. |
| 4,849,812 A | 7/1989 | Borgers et al. |
| 4,862,267 A | 8/1989 | Gillard et al. |
| 4,864,393 A | 9/1989 | Harradine et al. |

(Continued)

FOREIGN PATENT DOCUMENTS

EP    0 279 053    8/1988

(Continued)

OTHER PUBLICATIONS

U.S. Appl. No. 60/501,081, filed Sep. 7, 2003, Srinivasan et al.

(Continued)

*Primary Examiner*—Behrooz Senfi
(74) *Attorney, Agent, or Firm*—Klarquist Sparkman, LLP

(57) ABSTRACT

Techniques and tools are described for decoding video data having extended range motion vectors. For example, a sequence level syntax element (such as a flag in a header) indicates whether one or more picture level syntax elements are present for one or more frames of the sequence. If so, then a picture level syntax element for a current frame is processed. The picture level syntax element indicates a motion vector range for the current frame, where the motion vector range may be a default range or one of multiple available extended ranges. Additionally, a signed modulus operation by a factor that depends on the motion vector range may be performed when reconstructing the horizontal and vertical motion vector components to assure that the motion vectors are within the motion vector range.

15 Claims, 12 Drawing Sheets

U.S. PATENT DOCUMENTS

| | | | |
|---|---|---|---|
| 4,999,705 A | 3/1991 | Puri | |
| 5,021,879 A | 6/1991 | Vogel | |
| 5,068,724 A | 11/1991 | Krause et al. | |
| 5,089,887 A | 2/1992 | Robert et al. | |
| 5,091,782 A | 2/1992 | Krause et al. | |
| 5,103,306 A | 4/1992 | Weiman et al. | |
| 5,105,271 A | 4/1992 | Niihara | |
| 5,111,292 A | 5/1992 | Kuriacose et al. | |
| 5,117,287 A | 5/1992 | Koike et al. | |
| 5,144,426 A | 9/1992 | Tanaka et al. | |
| 5,155,594 A | 10/1992 | Bernstein et al. | |
| 5,157,490 A | 10/1992 | Kawai et al. | |
| 5,175,618 A | 12/1992 | Ueda | |
| 5,193,004 A | 3/1993 | Wang et al. | |
| 5,223,949 A | 6/1993 | Honjo | |
| 5,227,878 A | 7/1993 | Puri et al. | |
| 5,258,836 A | 11/1993 | Murata | |
| 5,274,453 A | 12/1993 | Maeda | |
| 5,287,420 A | 2/1994 | Barrett | |
| 5,298,991 A | 3/1994 | Yagasaki et al. | |
| 5,317,397 A | 5/1994 | Odaka et al. | |
| 5,319,463 A | 6/1994 | Hongu et al. | |
| 5,343,248 A | 8/1994 | Fujinami | |
| 5,347,308 A | 9/1994 | Wai | |
| 5,376,971 A | 12/1994 | Kadono et al. | |
| 5,379,351 A | 1/1995 | Fandrianto et al. | |
| 5,386,234 A | 1/1995 | Veltman et al. | |
| 5,400,075 A | 3/1995 | Savatier | |
| 5,412,430 A | 5/1995 | Nagata | |
| 5,412,435 A | 5/1995 | Nakajima | |
| RE34,965 E | 6/1995 | Sugiyama | |
| 5,422,676 A | 6/1995 | Herpel et al. | |
| 5,424,779 A | 6/1995 | Odaka | |
| 5,426,464 A | 6/1995 | Casavant et al. | |
| 5,428,396 A * | 6/1995 | Yagasaki et al. | 375/240.16 |
| 5,442,400 A | 8/1995 | Sun | |
| 5,448,297 A | 9/1995 | Alattar et al. | |
| 5,453,799 A | 9/1995 | Yang et al. | |
| 5,457,495 A | 10/1995 | Hartung | |
| 5,461,421 A | 10/1995 | Moon | |
| RE35,093 E | 11/1995 | Wang et al. | |
| 5,465,118 A | 11/1995 | Hancock et al. | |
| 5,467,086 A | 11/1995 | Jeong | |
| 5,467,136 A | 11/1995 | Odaka | |
| 5,477,272 A | 12/1995 | Zhang | |
| RE35,158 E | 2/1996 | Sugiyama | |
| 5,491,523 A | 2/1996 | Sato | |
| 5,510,840 A | 4/1996 | Yonemitsu et al. | |
| 5,517,327 A | 5/1996 | Nakatani et al. | |
| 5,539,466 A | 7/1996 | Igarashi et al. | |
| 5,544,286 A | 8/1996 | Laney | |
| 5,546,129 A | 8/1996 | Lee | |
| 5,550,541 A | 8/1996 | Todd | |
| 5,552,832 A | 9/1996 | Astle | |
| 5,565,922 A | 10/1996 | Krause | |
| 5,574,504 A | 11/1996 | Yagasaki et al. | |
| 5,594,504 A | 1/1997 | Ebrahimi | |
| 5,594,813 A | 1/1997 | Fandrianto et al. | |
| 5,598,215 A | 1/1997 | Watanabe | |
| 5,598,216 A | 1/1997 | Lee | |
| 5,617,144 A | 4/1997 | Lee | |
| 5,619,281 A | 4/1997 | Jung | |
| 5,621,481 A | 4/1997 | Yasuda et al. | |
| 5,623,311 A | 4/1997 | Phillips et al. | |
| 5,648,819 A | 7/1997 | Tranchard | |
| 5,650,829 A | 7/1997 | Sugimoto et al. | |
| 5,654,771 A | 8/1997 | Tekalp et al. | |
| 5,659,365 A | 8/1997 | Wilkinson | |
| 5,666,461 A | 9/1997 | Igarashi et al. | |
| 5,668,608 A | 9/1997 | Lee | |
| 5,668,932 A | 9/1997 | Laney | |
| 5,687,097 A | 11/1997 | Mizusawa et al. | |
| 5,689,306 A | 11/1997 | Jung | |
| 5,692,063 A | 11/1997 | Lee et al. | |
| 5,699,476 A | 12/1997 | Van Der Meer | |
| 5,701,164 A | 12/1997 | Kato | |
| 5,715,005 A | 2/1998 | Masaki | |
| 5,717,441 A | 2/1998 | Serizawa et al. | |
| 5,731,850 A | 3/1998 | Maturi et al. | |
| 5,748,784 A | 5/1998 | Sugiyama | |
| 5,748,789 A | 5/1998 | Lee et al. | |
| 5,767,898 A | 6/1998 | Urano et al. | |
| 5,784,175 A | 7/1998 | Lee | |
| 5,786,860 A | 7/1998 | Kim et al. | |
| 5,787,203 A | 7/1998 | Lee et al. | |
| 5,793,897 A | 8/1998 | Jo et al. | |
| 5,796,855 A | 8/1998 | Lee | |
| 5,799,113 A | 8/1998 | Lee | |
| RE35,910 E | 9/1998 | Nagata et al. | |
| 5,825,830 A | 10/1998 | Kopf | |
| 5,825,929 A | 10/1998 | Chen et al. | |
| 5,835,144 A | 11/1998 | Matsumura et al. | |
| 5,835,146 A | 11/1998 | Stone | |
| 5,835,149 A | 11/1998 | Astle | |
| 5,844,613 A | 12/1998 | Chaddha | |
| 5,847,776 A | 12/1998 | Khmelnitsky | |
| 5,859,668 A | 1/1999 | Aono et al. | |
| 5,874,995 A | 2/1999 | Naimpally et al. | |
| 5,901,248 A | 5/1999 | Fandrianto et al. | |
| 5,905,542 A | 5/1999 | Linzer | |
| 5,923,375 A | 7/1999 | Pau | |
| 5,929,940 A | 7/1999 | Jeannin | |
| 5,946,042 A * | 8/1999 | Kato | 375/240.15 |
| 5,946,043 A | 8/1999 | Lee et al. | |
| 5,949,489 A | 9/1999 | Nishikawa et al. | |
| 5,959,673 A | 9/1999 | Lee | |
| 5,963,258 A | 10/1999 | Nishikawa et al. | |
| 5,963,259 A | 10/1999 | Nakaya et al. | |
| 5,963,673 A | 10/1999 | Kodama et al. | |
| 5,970,173 A | 10/1999 | Lee et al. | |
| 5,970,175 A | 10/1999 | Nishikawa et al. | |
| 5,973,743 A | 10/1999 | Han | |
| 5,973,755 A | 10/1999 | Gabriel | |
| 5,982,437 A | 11/1999 | Okazaki et al. | |
| 5,982,438 A | 11/1999 | Lin et al. | |
| 5,990,960 A | 11/1999 | Murakami et al. | |
| 5,991,447 A | 11/1999 | Eifrig et al. | |
| 6,002,439 A | 12/1999 | Murakami et al. | |
| 6,005,980 A | 12/1999 | Eifrig et al. | |
| RE36,507 E | 1/2000 | Iu | |
| 6,011,596 A | 1/2000 | Burl | |
| 6,026,195 A | 2/2000 | Eifrig et al. | |
| 6,035,070 A | 3/2000 | Moon et al. | |
| 6,040,863 A | 3/2000 | Kato | |
| 6,052,150 A | 4/2000 | Kikuchi | |
| 6,058,212 A | 5/2000 | Yokohama | |
| 6,067,322 A | 5/2000 | Wang | |
| 6,081,209 A | 6/2000 | Schuyler et al. | |
| 6,094,225 A | 7/2000 | Han | |
| RE36,822 E | 8/2000 | Sugiyama | |
| 6,097,759 A | 8/2000 | Murakami et al. | |
| 6,111,914 A | 8/2000 | Bist | |
| 6,130,963 A | 10/2000 | Uz et al. | |
| 6,148,027 A | 11/2000 | Song et al. | |
| 6,148,033 A | 11/2000 | Pearlstein et al. | |
| 6,154,495 A | 11/2000 | Yamaguchi et al. | |
| 6,167,090 A | 12/2000 | Iizuka | |
| 6,188,725 B1 | 2/2001 | Sugiyama | |
| 6,188,794 B1 | 2/2001 | Nishikawa et al. | |
| 6,201,927 B1 | 3/2001 | Comer | |
| 6,205,176 B1 | 3/2001 | Sugiyama | |
| 6,208,761 B1 | 3/2001 | Passagio et al. | |
| 6,215,905 B1 | 4/2001 | Lee et al. | |
| 6,219,070 B1 | 4/2001 | Baker et al. | |

| | | |
|---|---|---|
| 6,219,464 B1 | 4/2001 | Greggain et al. |
| 6,233,017 B1 | 5/2001 | Chaddha |
| 6,236,806 B1 | 5/2001 | Kojima et al. |
| RE37,222 E | 6/2001 | Yonemitsu |
| 6,243,418 B1 | 6/2001 | Kim |
| 6,259,741 B1 | 7/2001 | Chen et al. |
| 6,263,024 B1 | 7/2001 | Matsumoto |
| 6,263,065 B1 | 7/2001 | Durinovic-Johri et al. |
| 6,266,091 B1 | 7/2001 | Saha et al. |
| 6,271,885 B2 | 8/2001 | Sugiyama |
| 6,272,179 B1 | 8/2001 | Kadono |
| 6,275,528 B1 | 8/2001 | Isozaki et al. |
| 6,275,531 B1 | 8/2001 | Li |
| 6,281,942 B1 | 8/2001 | Wang |
| 6,282,243 B1 | 8/2001 | Kazui et al. |
| 6,289,049 B1 | 9/2001 | Kim et al. |
| 6,289,132 B1 | 9/2001 | Goertzen |
| 6,292,585 B1 | 9/2001 | Yamaguchi et al. |
| 6,295,376 B1 | 9/2001 | Nakaya |
| 6,307,887 B1 | 10/2001 | Gabriel |
| 6,307,973 B2 | 10/2001 | Nishikawa et al. |
| 6,310,918 B1 | 10/2001 | Saha et al. |
| 6,320,593 B1 | 11/2001 | Sobel et al. |
| 6,324,216 B1 | 11/2001 | Igarashi |
| 6,337,881 B1 | 1/2002 | Chaddha |
| 6,339,656 B1 | 1/2002 | Marui |
| 6,377,628 B1 | 4/2002 | Schultz et al. |
| 6,381,277 B1 | 4/2002 | Chun et al. |
| 6,381,279 B1 | 4/2002 | Taubman |
| 6,393,059 B1 | 5/2002 | Sugiyama |
| 6,396,876 B1 | 5/2002 | Babonneau et al. |
| 6,404,813 B1 | 6/2002 | Haskell et al. |
| 6,418,166 B1 | 7/2002 | Wu et al. |
| 6,430,316 B1 | 8/2002 | Wilkinson |
| 6,441,842 B1 | 8/2002 | Fandrianto et al. |
| 6,442,204 B1 | 8/2002 | Snook et al. |
| 6,449,312 B1 | 9/2002 | Zhang et al. |
| 6,496,608 B1 | 12/2002 | Chui |
| 6,519,287 B1 | 2/2003 | Hawkins et al. |
| 6,529,632 B1 | 3/2003 | Nakaya et al. |
| 6,539,056 B1 | 3/2003 | Sato et al. |
| 6,563,953 B2 | 5/2003 | Lin et al. |
| 6,647,061 B1 | 11/2003 | Panusopone et al. |
| 6,650,781 B2 | 11/2003 | Nakaya |
| 6,661,470 B1 | 12/2003 | Kawakami et al. |
| 6,671,323 B1 * | 12/2003 | Tahara et al. ........... 375/240.26 |
| 6,728,317 B1 | 4/2004 | Demos |
| RE38,563 E | 8/2004 | Eifrig et al. |
| 6,778,610 B2 * | 8/2004 | Lin ....................... 375/240.27 |
| 6,950,469 B2 | 9/2005 | Karczewicz et al. |
| 6,968,008 B1 | 11/2005 | Ribas-Corbera et al. |
| 6,980,596 B2 | 12/2005 | Wang et al. |
| 6,983,018 B1 | 1/2006 | Lin et al. |
| 7,020,200 B2 | 3/2006 | Winger |
| 7,023,919 B2 | 4/2006 | Cho et al. |
| 7,233,621 B2 | 6/2007 | Jeon |
| 7,317,839 B2 | 1/2008 | Holcomb |
| 2001/0019586 A1 | 9/2001 | Kang et al. |
| 2001/0050957 A1 | 12/2001 | Nakaya et al. |
| 2002/0186890 A1 | 12/2002 | Lee et al. |
| 2003/0076883 A1 | 4/2003 | Bottreau et al. |
| 2003/0095603 A1 | 5/2003 | Lan et al. |
| 2003/0099292 A1 | 5/2003 | Wang et al. |
| 2003/0099294 A1 | 5/2003 | Wang et al. |
| 2003/0112864 A1 | 6/2003 | Karczewicz et al. |
| 2003/0113026 A1 | 6/2003 | Srinivasan et al. |
| 2003/0142748 A1 | 7/2003 | Tourapis |
| 2003/0152146 A1 | 8/2003 | Lin et al. |
| 2003/0156646 A1 | 8/2003 | Hsu et al. |
| 2003/0179826 A1 | 9/2003 | Jeon |
| 2003/0202705 A1 | 10/2003 | Sun |
| 2004/0057523 A1 | 3/2004 | Koto et al. |
| 2005/0013497 A1 | 1/2005 | Hsu et al. |
| 2005/0013498 A1 | 1/2005 | Srinivasan |
| 2005/0036700 A1 | 2/2005 | Lan et al. |
| 2005/0036759 A1 | 2/2005 | Lin et al. |
| 2005/0053137 A1 | 3/2005 | Holcomb |
| 2005/0053147 A1 | 3/2005 | Mukerjee et al. |
| 2005/0053149 A1 | 3/2005 | Mukerjee et al. |
| 2005/0053292 A1 | 3/2005 | Mukerjee et al. |
| 2005/0058205 A1 * | 3/2005 | Holcomb et al. ........ 375/240.23 |
| 2005/0100093 A1 | 5/2005 | Holcomb |
| 2005/0226335 A1 | 10/2005 | Lee et al. |
| 2006/0013307 A1 | 1/2006 | Olivier et al. |

FOREIGN PATENT DOCUMENTS

| | | |
|---|---|---|
| EP | 0 397 402 | 11/1990 |
| EP | 0 526 163 | 2/1993 |
| EP | 0535746 | 4/1993 |
| EP | 0 540 350 | 5/1993 |
| EP | 0 588 653 | 3/1994 |
| EP | 0 614 318 | 9/1994 |
| EP | 0 625 853 | 11/1994 |
| EP | 0 651 574 | 5/1995 |
| EP | 0 771 114 | 5/1997 |
| EP | 0 786 907 | 7/1997 |
| EP | 0 825 778 | 2/1998 |
| EP | 0 830 029 | 3/1998 |
| EP | 0 863 675 | 9/1998 |
| EP | 0 884 912 | 12/1998 |
| EP | 0 944 245 | 9/1999 |
| GB | 2328337 | 2/1999 |
| GB | 2332115 | 6/1999 |
| GB | 2343579 | 5/2000 |
| JP | 61205086 | 9/1986 |
| JP | 62 213 494 | 9/1987 |
| JP | 3001688 | 1/1991 |
| JP | 3 129 986 | 3/1991 |
| JP | 6 078 295 | 3/1994 |
| JP | 6 078 298 | 3/1994 |
| JP | 06-276481 | 9/1994 |
| JP | 06-276511 | 9/1994 |
| JP | 7-274171 | 10/1995 |
| JP | 08-140099 | 5/1996 |
| JP | 09-322163 | 12/1997 |
| JP | 10 056 644 | 2/1998 |
| JP | 6292188 | 10/2004 |
| WO | 98/03018 | 1/1998 |
| WO | WO 00/33581 | 8/2000 |
| WO | WO 01/95633 | 12/2001 |
| WO | WO 03/026296 | 3/2003 |

OTHER PUBLICATIONS

U.S. Appl. No. 60/501,133, filed Sep. 7, 2003, Holcomb et al.
Anonymous, "DivX Multi Standard Video Encoder," 2 pp.
Bartkowiak et al., "Color Video Compression Based on Chrominance Vector Quantization," *7th Int'l Workshop on Systems, Signals and Image Processing, IWSSIP 2000*, Maribor 7-9 VI, pp. 107-110 (2000).
Benzler et al., "Improving multiresolution motion compensating hybrid coding by drift reduction," *Picture Coding Symposium*, 4 pp. (1996).
Benzler et al., "Motion and aliasing compensating prediction with quarter-pel accuracy and adaptive overlapping blocks as proposal for MPEG-4 tool evaluation—Technical description," ISO/IEC JTC1/SC29/WG11, MPEG 95/0552, 5 pp. (document marked 1995).
Benzler, "Results of core experiments P8 (Motion and Aliasing Compensating Prediction)," ISO/IEC JTC1/SC29/WG11, MPEG 97/2625, 8 pp. (document marked 1997).
Borman et al., "Block-matching Sub-pixel Motion Estimation from Noisy, Under-Sampled Frames—an Empirical Performance Evaluation," *SPIE Visual Comm. & Image Processing*, 10 pp. (1999).
Conklin et al., "Multi-resolution Motion Estimation," *Proc. ICASSP '97*, Munich, Germany, 4 pp. (1997).

Davis et al., "Equivalence of subpixel motion estimators based on optical flow and block matching," *Proc. IEEE Int'l Symposium on Computer Vision*, pp. 7-12 (1995).

de Haan et al., "Sub-pixel motion estimation with 3-D recursive search block-matching," *Signal Processing: Image Comm.6*, pp. 229-239 (1994).

Ericsson, "Fixed and Adaptive Predictors for Hybrid Predictive/Transform Coding," *IEEE Transactions on Comm.*, vol. COM-33, No. 12, pp. 1291-1302 (1985).

Flierl et al., "Multihypothesis Motion Estimation for Video Coding," *Proc. DCC*, 10 pp. (Mar. 2001).

Girod, "Efficiency Analysis of Multihypothesis Motion-Compensated Prediction for Video Coding," *IEEE Transactions on Image Processing*, vol. 9, No. 2, pp. 173-183 (Feb. 2000).

Girod, "Motion-Compensating Prediction with Fractional-Pel Accuracy," *IEEE Transactions on Comm.*, vol. 41, No. 4, pp. 604-612 (1993).

Girod, "Motion Compensation: Visual Aspects, Accuracy, and Fundamental Limits," *Motion Analysis and Image Sequence Processing*, Kluwer Academic Publishers, pp. 125-152 (1993).

Horn et al., "Estimation of Motion Vector Fields for Multiscale Motion Compensation," *Proc. Picture Coding Symp. (PCS 97)*, pp. 141-144 (Sep. 1997).

Hsu et al., "A Low Bit-Rate Video Codec Based on Two-Dimensional Mesh Motion Compensation with Adaptive Interpolation," *IEEE Transactions on Circuits and Systems for Video Technology*, vol. II, No. 1, pp. 111-117 (Jan. 2001).

IBM Technical Disclosure Bulletin, "Advanced Motion Estimation for Moving Picture Expert Group Encoders," vol. 39, No. 4, pp. 323-324 (Apr. 1996).

ISO/IEC, "MPEG-4 Video Verification Model Version 10.0," ISO/IEC JTC1/SC29/WG11, MPEG98/N1992 (ed. Ebrahimi) (document marked Feb. 1998).

ITU—Q15-F-24, "MVC Video Codec—Proposal for H.26L," Study Group 16, Video Coding Experts Group (Question 15), 28 pp. (document marked as generated in 1998).

Iwahashi et al., "A Motion Compensation Technique for Downscaled Pictures in Layered Coding," *IEICE Transactions on Comm.*, vol. E77-B, No. 8, pp. 1007-1012 (Aug. 1994).

Jeong et al., "Adaptive Huffman Coding of 2-D DCT Coefficients for Image Sequence Compression," *Signal Processing: Image Communication*, vol. 7, 11 pp. (1995).

Joint Video Team of ISO/IEC MPEG and ITU-T VCEG, "Committee Draft of Joint Video Specification (ITU-T Recommendation H.264, ISO/IEC 14496-10 AVC)," 142 pp. (Aug. 2002).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

Keys, "Cubic Convolution Interpolation for Digital Image Processing," *IEEE Transactions on Acoustics, Speech & Signal Processing*, vol. ASSP-29, No. 6, pp. 1153-1160 (1981).

Konrad et al., "On Motion Modeling and Estimation for Very Low Bit Rate Video Coding," *Visual Comm. & Image Processing (VCIP '95)*, 12 pp. (May 1995).

Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).

Lopes et al., "Analysis of Spatial Transform Motion Estimation with Overlapped Compensation and Fractional-pixel Accuracy," *IEEE Proc. Visual Image Signal Processing*, vol. 146, No. 6, pp. 339-344 (Dec. 1999).

Morimoto et al., "Fast Electronic Digital Image Stabilization," *Proc. ICPR*, Vienna, Austria, 5 pp. (1996).

"Overview of MPEG-2 Test Model 5," 5 pp. [Downloaded from the World Wide Web on Mar. 1, 2006].

Ribas-Corbera et al., "On the Optimal Block Size for Block-based Motion-Compensated Video Coders," *SPIE Proc. of Visual Comm. & Image Processing*, vol. 3024, 12 pp. (1997).

Ribas-Corbera et al., "On the Optimal Motion Vector Accuracy for Block-based Motion-Compensated Video Coders," *Proc. SPIE Digital Video Compression*, San Jose, CA, 13 pp. (1996).

Schultz et al., "Subpixel Motion Estimation for Super-Resolution Image Sequence Enhancement," *Journal of Visual Comm. & Image Representation*, vol. 9, No. 1, pp. 38-50 (Mar. 1998).

Sullivan et al., "The H.264/AVC Advanced Video Coding Standard: Overview and Introduction to the Fidelity Range Extenstions," 21 pp. (Aug. 2004).

"The TML Project Web-Page and Archive," (including pages of code marked "image.cpp for H.26L decoder, Copyright 1999" and "image.c"), 24 pp. [Downloaded from the World Wide Web on Jun. 1, 2005].

Triggs, "Empirical Filter Estimation for Subpixel Interpolation and Matching," *Int'l Conf. Computer Vision '01*, Vancouver, Canada, 8 pp. (Jul. 2001).

Triggs, "Optimal Filters for Subpixel Interpolation and Matching," *Int'l Conf. Computer Vision '01*, Vancouver, Canada, 10 pp. (Jul. 2001).

"Video Coding Using Wavelet Decomposition for Very Low Bit-Rate Networks," 16 pp. (1997).

Wang et al., "Interlace Coding Tools for H.26L Video Coding," ITU-T SG16/Q.6 VCEG-O37, pp. 1-20 (Dec. 2001).

Weiss et al., "Real Time Implementation of Subpixel Motion Estimation for Broadcast Applications," pp. $^{7}/_{1}$-$^{7}/_{3}$ (1990).

Wiegand et al., "Long-term Memory Motion Compensated Prediction," IEEE Transactions on Circuits & Systems for Video Technology, vol. 9, No. 1, pp. 70-84 (Feb. 1999).

Wiegand, "Joint Model No. 1, Revision 1 (JM1-r1)," JVT-A003R1, 80 pp. (document marked "Generated: Jan. 18, 2002").

Wien, "Variable Block-Size Transforms for Hybrid Video Coding," Dissertation, 182 pp. (Feb. 2004).

Wu et al., "Joint estimation of forward and backward motion vectors for interpolative prediction of video," *IEEE Transactions on Image Processing*, vol. 3, No. 5, pp. 684-687 (Sep. 1994).

Yang et al., "Very High Efficiency VLSI Chip-pair for Full Search Block Matching with Fractional Precision," *Proc. ICASSP/IEEE Int'l Conf. on Acoustics, Speech & Signal Processing*, Glasgow, pp. 2437-2440 (May 1989).

ISO/IEC 11172-2, "Coding of Moving Pictures and Associated Audio for Digital Storage Media at Up to About 1,5 Mbit/s, Part 2: Video," 122 pp. (1993).

ISO/IEC 14496-2, "Coding of Audio-Visual Objects: Visual, ISO/IEC 14496-2," 326 pp. (1998).

ITU-T Recommendation H.261, "Line Transmission of Non-Telephone Signals," International Telecommunication Union, 29 pp. (Mar. 1993).

ITU-T Recommendation H.262, "Transmission of Non-Telephone Signals," International Telecommunication Union, 216 pp. (Jul. 1995).

ITU-T Recommendation H.263, "Series H: Audiovisual and Multimedia Systems, Infrastructure of Audiovisual Services—Coding of Moving Video," International Telecommunication Union, 167 pp. (Feb. 1998).

Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," BetaNews, 18 pp. (Jul. 2002) [Downloaded from the World Wide Web on Mar. 16, 2004].

U.S. Appl. No. 60/341,674, filed Dec. 17, 2001, Lee et al.

U.S. Appl. No. 60/488,710, filed Jul. 18, 2003, Srinivasan et al.

Yu et al., "Two-Dimensional Motion Vector Coding for Low Bitrate Videophone Applications," Proc. Int'l Conf. on Image Processing, Los Alamitos, US, pp. 414-417, IEEE Comp. Soc. Press (1995).

Cliff Reader, "History of MPEG Video Compression—Ver. 4.0," 99 pp., document marked Dec. 16, 2003.

Printouts of FTP directories from http://ftp3.itu.ch , 8 pp. (downloaded from the World Wide Web on Sep. 20, 2005.).

ITU-T, "H.26L Test Model Long Term No. 5 (TML-5) draft0," Study Group 16, Video Coding Experts Group (Question 15), Document Q15-K-59, 35 pp. (ed. Gisle Bjontegaard) (Document dated Oct. 2000).

Tourapis et al., "Predictive Motion Vector Field Adaptive Search Technique (PMVFAST)—Enhancing Block Based Motion Estimation," *Proc. Visual Communications and Image Processing*, 10 pp. (Jan. 2001).

Wedi, "Complexity Reduced Motion Compensated Prediction with ⅛-pel Displacement Vector Resolution," ITU Study Group 16, Video Coding Experts Group (Question 6), Document VCEG-L20, 8 pp. (Document dated Dec. 2000).

* cited by examiner

MV Predictor Computation Pseudo Code 800

```
if (predictorA is not out of bound) {
    if (predictorC is out of bound && predictorB is out of bound) { // picture consists of one MB
        predictor_x = predictorA_x;
        predictor_y = predictorA_y;
    } else {
        if (predictorC is out of bound) {
            predictorC_x = predictorC_y = 0;
        }
        numIntra = 0;
        if (predictorA is intra) {
            predictorA_x = predictoA_y = 0;
            numIntra ++;
        }
        if (predictorB is intra) {
            predictorB_x = predictoB_y = 0;
            numIntra ++;
        }
        if (predictorC is intra) {
            predictorC_x = predictoC_y = 0;
            numIntra ++;
        }
        // calculate predictor from A, B and C predictor candidates
        predictor_x = median3(predictorA_x, predictorB_x, predictorC_x);
        predictor_y = median3(predictorA_y, predictorB_y, predictorC_y);
    }
} else if (predictorC is not out of bound) {
    predictor_x = predictorC_x;
    predictor_y = predictorC_x;
} else {
    predictor_x = predictor_y = 0;
}
```

MV Differential Decoding Pseudo Code
900

Index decoding 910
```
index = vlc_decode()    // Use the Huffman table indicated
                        //  by MVTAB in the picture layer
index = index + 1
```

"Last" determination 920
```
if (index >= 37)
{
        last_flag = 1
        index = index - 37
}
else
        last_flag = 0
```

Set intra_flag 930
```
intra_flag = 0
```

Decoding 0-value DMV's 940
```
if (index == 0)
{
        dmv_x = 0
        dmv_y = 0
}
```

Decoding long DMV's 950
```
else if (index == 35)
{
        dmv_x = get_bits(k_x – halfpel_flag)
        dmv_y = get_bits(k_y – halfpel_flag)
}
```

Decoding intra types 960
```
else if (index == 36)
{
        intra_flag = 1
        dmv_x = 0
        dmv_y = 0
}
```

Decoding normal range DMV's 970
```
else
{
index1 = index % 6
if (halfpel_flag == 1 && index1 == 5)
    hpel = 1
else
    hpel = 0
       val = get_bits (size_table[index1] - hpel)
       sign = 0 - (val & 1)
       dmv_x = sign ^ ((val >> 1) + offset_table[index1])
       dmv_x = dmv_x - sign index1 = index / 6
if (halfpel_flag == 1 && index1 == 5)
    hpel = 1
else
    hpel = 0
       val = get_bits (size_table[index1] - hpel)
       sign = 0 - (val & 1)
       dmv_y = sign ^ ((val >> 1) + offset_table[index1])
       dmv_y = dmv_x - sign
}
```

Figure 9

EXTENDED RANGE MOTION VECTORS

RELATED APPLICATION INFORMATION

This application is a continuation-in-part of U.S. patent application Ser. No. 10/622,841, filed on Jul. 18, 2003, the disclosure of which is incorporated herein by reference, and claims the benefit of U.S. Provisional Patent Application Ser. No. 60/488,710, filed Jul. 18, 2003, the disclosure of which is incorporated herein by reference.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD

Tools and techniques for decoding video data that may include extended ranges for motion vectors are described.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel as a set of three samples totaling 24 bits. For instance, a pixel may comprise an 8-bit luminance sample (also called a luma sample) that defines the grayscale component of the pixel and two 8-bit chrominance sample values (also called chroma samples) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which quality of the video does not suffer, but decreases in the bit rate are limited by the inherent amount of variability (sometimes called entropy) of the video data. Or, compression can be lossy, in which quality of the video suffers, but achievable decreases in the bit rate are more dramatic. Lossy compression is often used in conjunction with lossless compression—in a system design in which the lossy compression establishes an approximation of information and lossless compression techniques are applied to represent the approximation.

In general, video compression techniques include "intra-picture" compression and "inter-picture" compression, where a picture is, for example, a progressively scanned video frame, an interlaced video frame (having alternating lines for video fields), or an interlaced video field. For progressive frames, intra-picture compression techniques compress individual frames (typically called I-frames or key frames), and inter-picture compression techniques compress frames (typically called predicted frames, P-frames, or B-frames) with reference to preceding and/or following frames (typically called reference or anchor frames).

The predicted frames may be divided into regions called macroblocks. A matching region in a reference frame for a particular macroblock is specified by sending motion vector information for the macroblock. A motion vector indicates the location of the region in the reference frame whose pixels are to be used as a predictor for the pixels current macroblock. The pixel-by-pixel difference, often called the error signal or residual, between the current macroblock (or the blocks thereof) and the macroblock predictor is derived. This error signal usually has lower entropy than the original signal. Therefore, the information can be encoded at a lower rate. An encoder performs motion estimation by determining a motion vector for a region of a frame by searching for a matching region in one or more reference frames to use as a predictor. An encoder or decoder performs motion compensation by applying the motion vector to find the predictor in the one or more reference frames.

The motion vector value for a macroblock is often correlated with the motion vectors for spatially surrounding macroblocks. Thus, compression of the data used to transmit the motion vector information can be achieved by coding the differential between the motion vector and a motion vector predictor formed from neighboring motion vectors.

Often in video compression techniques, blocks of pixels or other spatial domain video data such as residuals are transformed into transform domain data, which is often frequency domain (i.e., spectral) data. The resulting blocks of spectral data coefficients may be quantized and then entropy encoded.

When the data is decompressed prior to the resulting video being displayed, a decoder typically performs the inverse of the compression operations. For example, a decoder may perform entropy decoding, inverse quantization, and an inverse transform while decompressing the data. When motion compensation is used, the decoder (and encoder) reconstruct a frame from one or more previously reconstructed frames (which are now used as reference frames), and the newly reconstructed frame may then be used as a reference frame for motion compensation for layer frames.

Numerous companies have produced video codecs. For example, Microsoft Corporation has produced a video encoder and decoder released for Windows Media Video 8. Aside from these products, numerous international standards specify aspects of video decoders and formats for compressed video information. These standards include the H.261, MPEG-1, H.262, H.263, and MPEG-4 standards. Directly or by implication, these standards also specify certain encoder details, but other encoder details are not specified. These products and standards use (or support the use of) different combinations of the compression and decompression techniques described above. In particular, these products and standards provide various techniques for performing motion compensation, computing motion vector predictors, and signaling motion vector information (such as differential motion vectors). The allowable range of motion vectors in such standards is often limited to a default range, at least for basic modes. However, in some situations it may be advantageous to include longer motion vectors that extend beyond the default range. Several standards allow extended range motion vectors. For example, see the H.263 standard at section 6.1.1 and Annex D; the H.262 standard at section 6.2.3, 6.3.9, and 7.6.3; the MPEG-1 standard at 2.4.3.4, 2.4.4.2, 2.4.4.3, and 6.2.3, and the MPEG-4 standard at 7.5.3 and 7.5.4. While these standards permit extended range motion vectors, however, the signaling and decoding mechanisms specified therein for such motion vectors are inefficient in many scenarios.

SUMMARY

The present invention relates to tools and techniques for decoding motion vectors that extend beyond a default allowable range.

According to a first aspect of the tools and techniques, a variable length code that indicates a motion vector range for a current frame is decoded. The range is selected from among plural extended ranges and a default range that are each represented with an associated variable length code in a table. One or more motion vectors for blocks and/or macroblocks of the current frame are reconstructed based at least in part on the range for the current frame.

According to a second aspect of the tools and techniques, a motion vector range is chosen from among multiple available motion vector ranges and a motion vector is reconstructed. The reconstruction includes computing a signed modulus by a factor that varies depending on the chosen motion vector range.

According to a third aspect of the tools and techniques, a sequence layer syntax element is parsed. The element indicates whether extended range motion vectors are possible for a sequence of frames. If so, then additional processing that allows the use of extended range motion vectors for the sequence of frames is performed. If not, then the additional processing is skipped.

Additional features and advantages will be made apparent from the following detailed description of various embodiments that proceeds with reference to the accompanying drawings.

BRIEF DESCRIPTION OF THE FIGURES

FIGS. 7A-7C are diagrams showing neighboring macroblocks and/or blocks for motion vector prediction for motion vectors that may include extended range motion vectors.

FIG. 8 is example pseudocode fragment for computing a motion vector predictor for a motion vector such as an extended range motion vector.

FIG. 9 is example pseudocode for reconstructing motion vector differentials that may include differentials for extended range motion vectors.

DETAILED DESCRIPTION

Described embodiments relate to techniques and tools for decoding video data that may utilize extended motion vector ranges, as well as techniques and tools for forming and parsing bitstreams that include such video data. The various techniques and tools can be used in combination or independently.

I. Computing Environment

Figure 1:
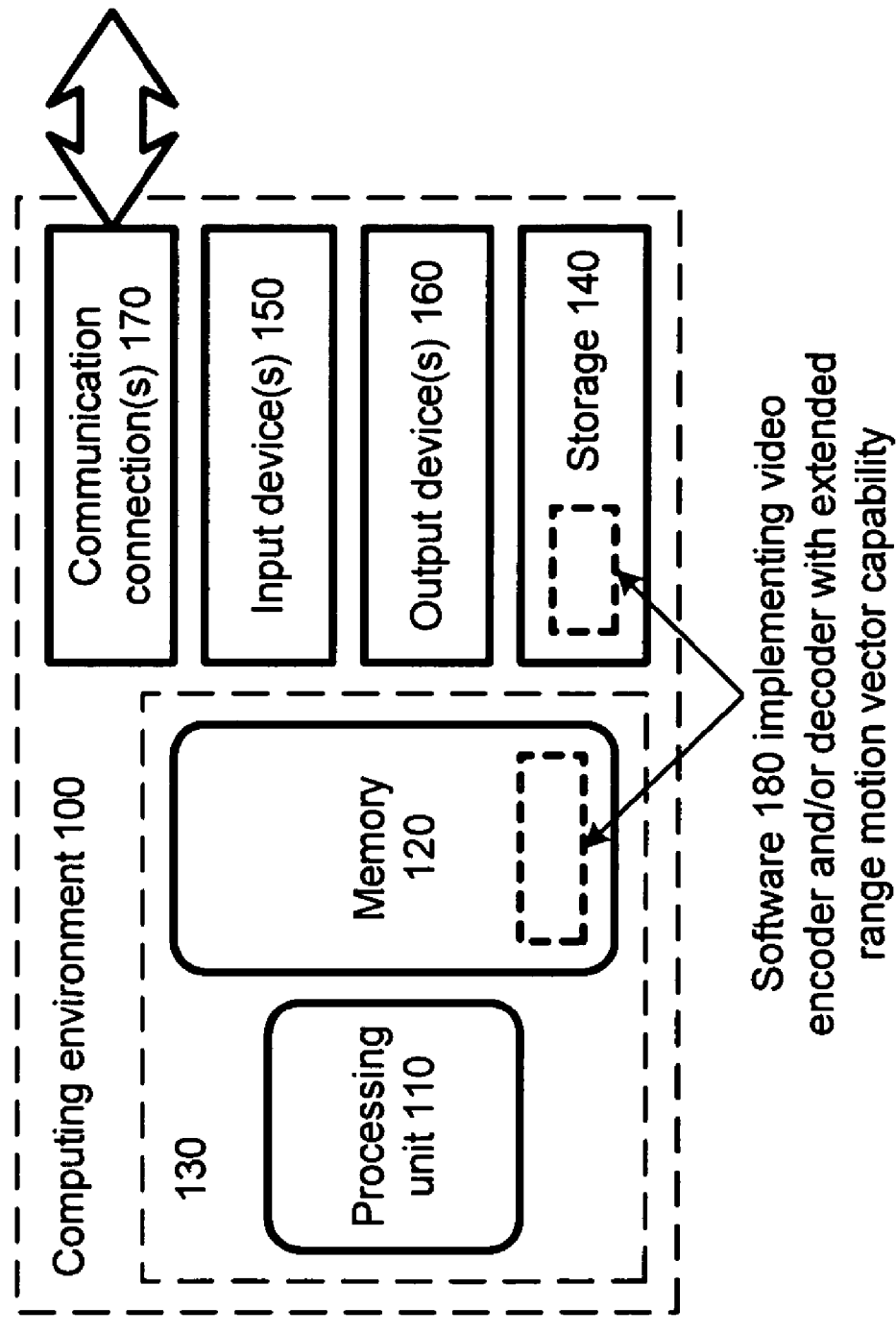
FIG. 1 is a block diagram of a suitable computing environment in which several described embodiments may be implemented.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing an encoder and/or decoder, such as a video encoder and/or decoder with extended range motion vector capabilities.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the encoder and/or decoder with extended range motion vector capabilities.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Video Encoder and Decoder

Figure 2:
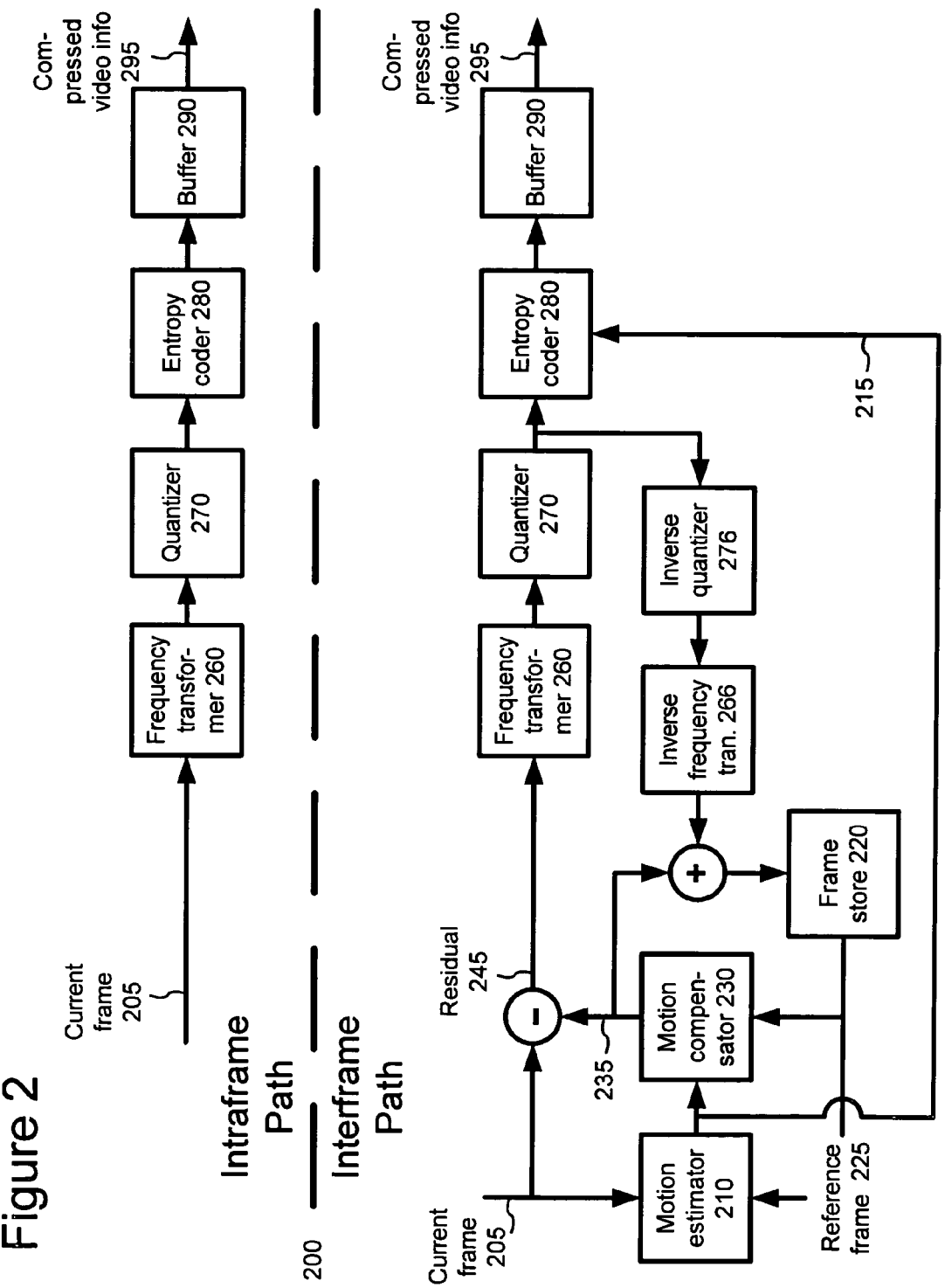
FIG. 2 is a block diagram of a video encoder system in conjunction with which several described embodiments may be implemented.
Figure 3:
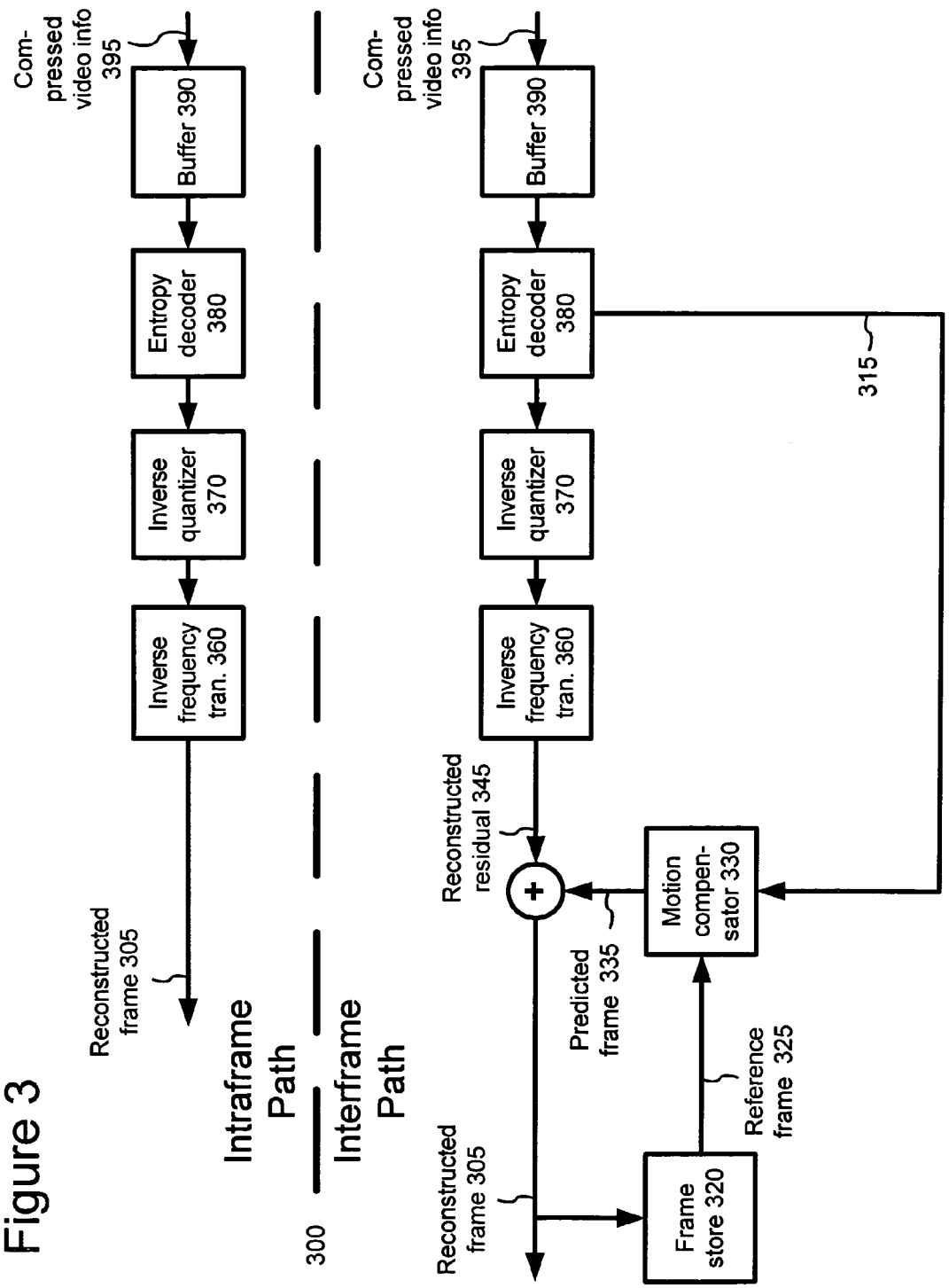
FIG. 3 is a block diagram of a video decoder system in conjunction with which several described embodiments may be implemented.

FIG. 2 is a block diagram of a generalized video encoder system (200), and FIG. 3 is a block diagram of a video decoder system (300), in conjunction with which various described embodiments may be implemented.

The relationships shown between modules within the encoder and decoder indicate the main flow of information in the encoder and decoder; other relationships are not shown for the sake of simplicity. In particular, FIGS. 2 and 3 usually do not show side information indicating the encoder settings, modes, tables, etc. used for a video sequence, frame, macroblock, block, etc. Such side information is sent in the output bitstream, typically after entropy encoding of the side information. The format of the output bitstream can be Windows Media Video version 9 format or another format.

The encoder (200) and decoder (300) are block-based and use a 4:2:0 macroblock format with each macroblock including 4 luminance 8×8 luminance blocks (at times treated as one 16×16 macroblock) and two 8×8 chrominance blocks. Alternatively, the encoder (200) and decoder (300) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Encoder

FIG. 2 is a block diagram of a general video encoder system (200) that can perform motion vector prediction operations for extended range motion vectors as described below, and encode extended range motion vectors by performing the inverse of the decoder and bitstream parsing operations described below. The encoder system (200) receives a sequence of video frames including a current frame (205), and produces compressed video information (295) as output. Particular embodiments of video encoders typically use a variation or supplemented version of the generalized encoder (200).

The encoder system (200) compresses predicted frames and key frames. For the sake of presentation, FIG. 2 shows a path for key frames through the encoder system (200) and a path for forward-predicted frames. Many of the components of the encoder system (200) are used for compressing both key frames and predicted frames. The exact operations performed by those components can vary depending on the type of information being compressed.

A predicted frame (also called p-frame, b-frame for bi-directional prediction, or inter-coded frame) is represented in terms of prediction (or difference) from one or more other frames. A prediction residual is the difference between what was predicted and the original frame. In contrast, a key frame (also called an i-frame or intra-coded frame) is compressed without reference to other frames.

If the current frame (205) is a forward-predicted frame, a motion estimator (210) estimates motion of macroblocks or other sets of pixels of the current frame (205) with respect to a reference frame, which is the reconstructed previous frame (225) buffered in the frame store (220). In alternative embodiments, the reference frame is a later frame or the current frame is bi-directionally predicted. The motion estimator (210) can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator (210) outputs as side information motion information (215) such as motion vectors. A motion compensator (230) applies the motion information (215) to the reconstructed previous frame (225) to form a motion-compensated current frame (235). The prediction is rarely perfect, however, and the difference between the motion-compensated current frame (235) and the original current frame (205) is the prediction residual (245). Alternatively, a motion estimator and motion compensator apply another type of motion estimation/compensation.

For extended range motion vectors, the encoder (200) encodes the vectors and produces side information for the motion vectors as part of the motion information (215), which is processed by a decoder as described below. The side information also includes information indicating if and when extended range motion vectors are used for the sequence or for a particular frame. For example, the encoder produces a sequence layer flag that indicates whether extended motion vectors may be present in the sequence and, if extended motion vectors may be present, produces a picture layer signal for each forward or bi-directionally predicted frame, and possibly other frames, that indicates whether an extended motion vector range is used for that frame, as described with referenced the syntax diagrams below.

A frequency transformer (260) converts the spatial domain video information into frequency domain (i.e., spectral) data. For block-based video frames, the frequency transformer (260) applies a discrete cosine transform ["DCT"] or variant of DCT to blocks of the pixel data or prediction residual data, producing blocks of DCT coefficients. Alternatively, the frequency transformer (260) applies another conventional frequency transform such as a Fourier transform or uses wavelet or subband analysis. In embodiments in which the encoder uses spatial extrapolation (not shown in FIG. 2) to encode blocks of key frames, the frequency transformer (260) can apply a re-oriented frequency transform such as a skewed DCT to blocks of prediction residuals for the key frame. In other embodiments, the frequency transformer (260) applies an 8×8, 8×4, 4×8, or other size frequency transforms (e.g., DCT) to prediction residuals for predicted frames.

A quantizer (270) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (200) can use frame dropping, adaptive filtering, or other techniques for rate control.

If a given macroblock in a predicted frame has no information of certain types (e.g., no motion information for the macroblock and no residual information), the encoder (200) may encode the macroblock as a skipped macroblock. If so, the encoder signals the skipped macroblock in the output bitstream of compressed video information (295).

When a reconstructed current frame is needed for subsequent motion estimation/compensation, an inverse quantizer (276) performs inverse quantization on the quantized spectral data coefficients. An inverse frequency transformer (266) then performs the inverse of the operations of the frequency transformer (260), producing a reconstructed prediction residual (for a predicted frame) or a reconstructed key frame. If the current frame (205) was a key frame, the reconstructed key frame is taken as the reconstructed current frame (not shown). If the current frame (205) was a predicted frame, the reconstructed prediction residual is added to the motion-compensated current frame (235) to form the reconstructed current frame. The frame store (220) buffers the reconstructed current frame for use in predicting the next frame. In some embodiments, the encoder applies a deblocking filter to the reconstructed frame to adaptively smooth discontinuities in the blocks of the frame.

The entropy coder (280) compresses the output of the quantizer (270) as well as certain side information (e.g., motion information (215), spatial extrapolation modes, quantization step size). Typical entropy coding techniques include arithmetic coding, differential coding, Huffman coding, run length coding, LZ coding, dictionary coding, and combinations of the above. The entropy coder (280) typically uses different coding techniques for different kinds of information (e.g., DC coefficients, AC coefficients, different kinds of side information), and can choose from among multiple code tables within a particular coding technique.

The entropy coder (280) puts compressed video information (295) in the buffer (290). A buffer level indicator is fed back to bit rate adaptive modules.

The compressed video information (295) is depleted from the buffer (290) at a constant or relatively constant bit rate and stored for subsequent streaming at that bit rate. Therefore, the level of the buffer (290) is primarily a function of the entropy of the filtered, quantized video information, which affects the efficiency of the entropy coding. Alternatively, the encoder system (200) streams compressed video information immediately following compression, and the level of the buffer (290) also depends on the rate at which information is depleted from the buffer (290) for transmission.

Before or after the buffer (290), the compressed video information (295) can be channel coded for transmission over the network. The channel coding can apply error detection and correction data to the compressed video information (295).

The encoder (200) can produce the hierarchical bitstream described below, perform motion vector prediction as described below, and perform the inverse of the motion vector decoding operations described below. The encoder may also use the techniques described above in various combinations, individually, or in conjunction with other techniques. Alternatively, another encoder or tool performs one or more encoding techniques.

B. Video Decoder

FIG. 3 is a block diagram of a general video decoder system (300). The decoder system (300) receives information (395) for a compressed sequence of video frames and produces output including a reconstructed frame (305). Particular embodiments of video decoders typically use a variation or supplemented version of the generalized decoder (300).

The decoder system (300) decompresses predicted frames and key frames. For the sake of presentation, FIG. 3 shows a path for key frames through the decoder system (300) and a path for forward-predicted frames. Many of the components of the decoder system (300) are used for compressing both key frames and predicted frames. The exact operations performed by those components can vary depending on the type of information being compressed.

A buffer (390) receives the information (395) for the compressed video sequence and makes the received information available to the entropy decoder (380). The buffer (390) typically receives the information at a rate that is fairly constant over time, and includes a jitter buffer to smooth short-term variations in bandwidth or transmission. The buffer (390) can include a playback buffer and other buffers as well. Alternatively, the buffer (390) receives information at a varying rate. Before or after the buffer (390), the compressed video information can be channel decoded and processed for error detection and correction.

The entropy decoder (380) entropy decodes entropy-coded quantized data as well as entropy-coded side information (e.g., motion information (315), spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (380) frequently uses different decoding techniques for different kinds of information (e.g., DC coefficients, AC coefficients, different kinds of side information), and can choose from among multiple code tables within a particular decoding technique.

If the frame (305) to be reconstructed is a forward-predicted frame, a motion compensator (330) applies motion information (315) to a reference frame (325) to form a prediction (335) of the frame (305) being reconstructed. For example, the motion compensator (330) uses a macroblock motion vector to find a macroblock in the reference frame (325). A frame buffer (320) stores previous reconstructed frames for use as reference frames. The motion compensator (330) can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder (300) also reconstructs prediction residuals.

When the decoder needs a reconstructed frame for subsequent motion compensation, the frame store (320) buffers the reconstructed frame for use in predicting the next frame. In some embodiments, the encoder applies a deblocking filter to the reconstructed frame to adaptively smooth discontinuities in the blocks of the frame.

An inverse quantizer (370) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (360) converts the quantized, frequency domain data into spatial domain video information. For block-based video frames, the inverse frequency transformer (360) applies an inverse DCT ["IDCT"] or variant of IDCT to blocks of the DCT coefficients, producing pixel data or prediction residual data for key frames or predicted frames, respectively. Alternatively, the frequency transformer (360) applies another conventional inverse frequency transform such as a Fourier transform or uses wavelet or subband synthesis. In embodiments in which the decoder uses spatial extrapolation (not shown in FIG. 3) to decode blocks of key frames, the inverse frequency transformer (360) can apply a re-oriented inverse frequency transform such as a skewed IDCT to blocks of prediction residuals for the key frame. In other embodiments, the inverse frequency transformer (360) applies an 8×8, 8×4, 4×8, or other size inverse frequency transforms (e.g., IDCT) to prediction residuals for predicted frames.

For extended range motion vectors, the decoder (300) processes side information (such as a signal indicating when extended range motion vectors may be present for the sequence or for a particular frame) and decodes the extended range motion vectors. For example, the decoder processes syntax elements such as those described with reference to the syntax diagrams below. As described below, if extended range motion vectors may be present in a frame, the syntax elements also signal an extended motion vector range to be used for the frame.

III. Example Bitstream Syntax for Extended Range Motion Vectors

An example bitstream includes a sequence of compressed progressive frames (or other pictures) and is divided into several hierarchical layers that are decoded by a decoder such as the decoder (300) of FIG. 3. The highest layer is the sequence layer (400) (illustrated in FIG. 4), which corresponds to the overall sequence of frames. Additionally, each compressed video frame is made up of data that is structured into three hierarchical layers. From top to bottom the layers are: picture (illustrated in FIG. 5 for a forward-predicted progressive frame), macroblock (illustrated in FIG. 6 for a forward-predicted progressive frame), and block (illustrated generally in FIG. 6 as part of the macroblock layer for a forward-predicted progressive frame).

Figure 4:
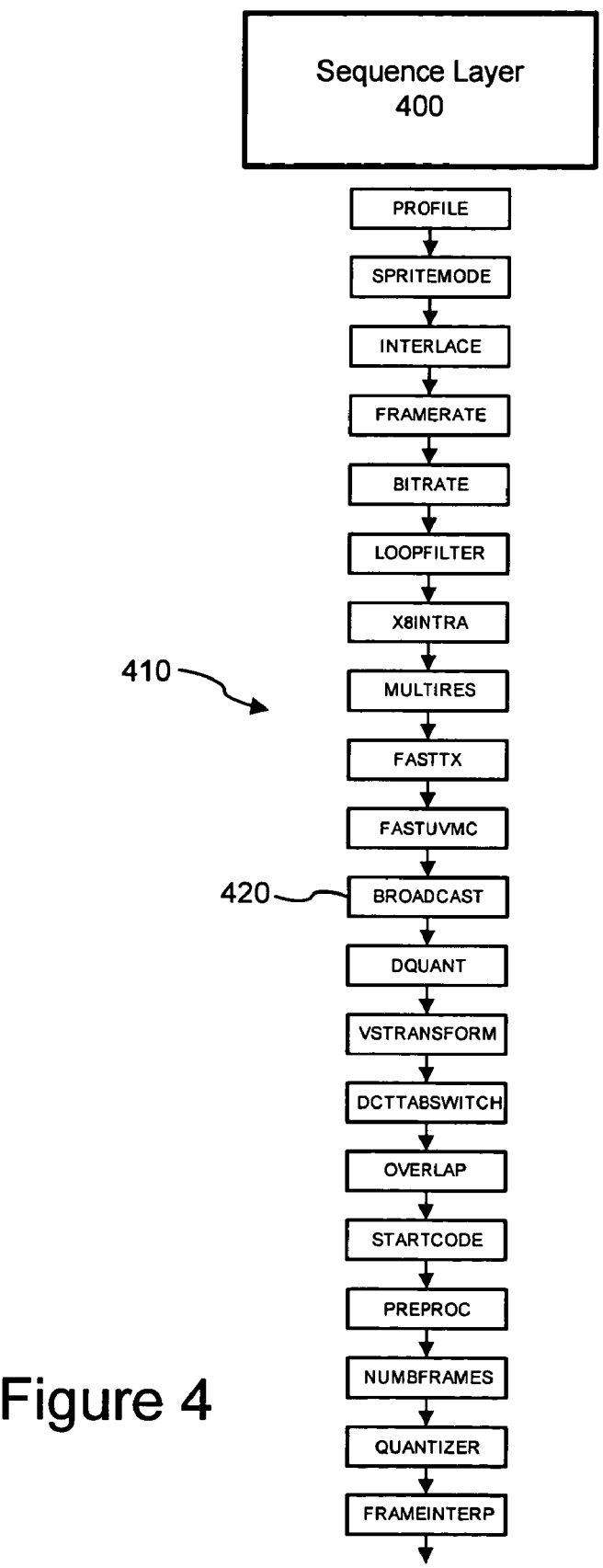
FIG. 4 is a diagram showing a sequence layer of an example bitstream syntax with syntax elements for signaling extended motion vector range information.
Figure 5:
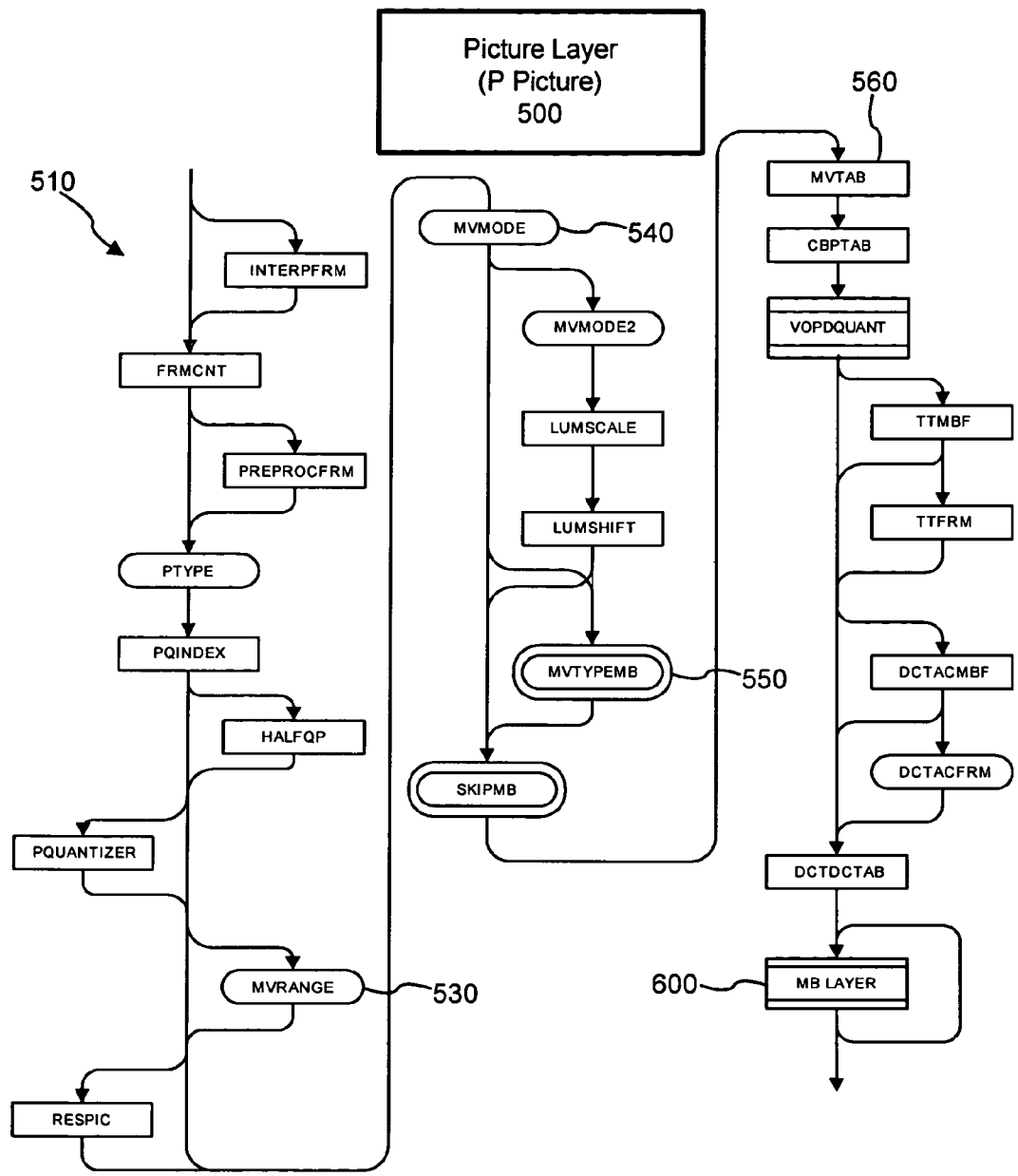
FIG. 5 is a diagram showing a forward predicted progressive frame layer of the example bitstream syntax of FIG. 4 with syntax elements for signaling extended motion vector range information.

FIG. 4 is a syntax diagram for the sequence layer (400), which includes a sequence header (410) followed by data for the picture layer (see FIG. 5). The sequence header (410) includes several sequence level elements that are processed by the decoder and used to decode the sequence of compressed frames, including a sequence level BROADCAST element (420). The BROADCAST element (420) is a 1-bit field that indicates whether the Broadcast mode is turned on or off. The Broadcast mode may be turned off for some profiles, regardless of the BROADCAST element (420). For other profiles, the Broadcast mode indicates the possibility of extended motion vectors in P frames. In other words, the BROADCAST element (420) indicates whether extended motion vectors may be present in P-frames in the sequence of frames, and thus whether a default allowable motion vector range might be extended for at least one frame in the sequence.

FIG. 5 is a syntax diagram for the picture layer (500) for a progressive forward predicted picture. Syntax diagrams for other frames, such as interlaced forward predicted pictures and progressive bi-directionally predicted frames (see FIG. 10), can have similar syntax elements. The picture layer (500) includes a picture header (510) followed by data for the macroblock layer (600) (see also FIG. 6). The picture header (510) includes several picture level elements that are processed by the decoder and used to decode the corresponding compressed frame. Some of those elements are only present if their presence is signaled or implied by a sequence level element or a preceding picture level element.

For example, the picture header (510) for a progressive P-frame includes a picture level MVRANGE element (530) that is only present if the sequence level BROADCAST element (420) is signaled. The MVRANGE element (530) may be any of four possible variable length binary codewords that each signal an allowable motion vector range for the current frame. Table 1 illustrates some motion vector ranges that may correspond to the MVRANGE codewords, where f is ¾ for ¼-pixel motion resolution and ½ for ½-pixel motion resolution. Each range in Table 1 includes a horizontal component range and a vertical component range. One of the four codewords (0 in the example below) signals the default range, indicating that the data for the current frame does not include any extended range motion vectors, where the default range is also used when the BROADCAST element is 0 or extended range motion vectors are not allowed for a profile. The remaining three codewords each signal a different extended allowable motion vector range for the current frame.

TABLE 1

First Alternative Set of MV Ranges Signaled by "MVRANGE"

| Codeword in binary | MV range in full pixel units (horiz × vert) |
| --- | --- |
| 0 (also default) | [−64, 63.f] × [−32, 31.f] |
| 10 | [−64, 63.f] × [−64, 63.f] |
| 110 | [−128, 127.f] × [−128, 127.f] |
| 111 | [−256, 255.f] × [−256, 255.f] |

Other ranges corresponding to the motion vector range codewords may instead be used, as is illustrated in Table 2 below. The ranges shown in Table 2 are the ranges used for decoding according to Table 3 and the half-pixel resolution flag as described below.

TABLE 2

Second Alternative Set of MV Ranges Signaled by "MVRANGE"

| Codeword in binary | MV range in full pixel units (horiz × vert) |
| --- | --- |
| 0 (also default) | [−64, 63.f] × [−32, 31.f] |
| 10 | [−128, 127.f] × [−64, 63.f] |
| 110 | [−512, 511.f] × [−128, 127.f] |
| 111 | [−1024, 1023.f] × [−256, 255.f] |

TABLE 2-continued

Second Alternative Set of MV Ranges Signaled by "MVRANGE"

| Codeword in binary | MV range in full pixel units (horiz × vert) |
| --- | --- |

A picture-layer MVMODE element (540) indicates the motion vector mode for the P-frame. Among other things, different MVMODE values may indicate (1) whether motion vector resolution for the frame is quarter pixel or half pixel, (2) what kind of sub-pixel interpolation to use for motion compensation, (3) whether to use intensity compensation on reference frames, and (4) whether only a single motion vector is used for each macroblock or up to four motion vectors per macroblock may be used.

As an example of pixel units used for motion vectors, in half pel units, a horizontal motion component of 4 would indicate a position 2 pixels to the right of the current position and a value of 5 would indicate a position of 2½ pixels to the right. In quarter pel units, a horizontal motion component of 4 would indicate a position 1 pixel to the right of the current position and a value of 5 would indicate a position of 1¼ pixels to the right.

Additional elements (including MVMODE2, LUMSCALE, and LUMSHIFT) may signal MVMODE information and intensity compensation parameters when intensity compensation is used.

If either one motion vector per macroblock or up to four motion vectors per macroblock may be used in the macroblocks of a frame, then a picture level MVTYPEMB element (550) uses bitplane coding to either signal the motion vector type (one or four) for each macroblock in the frame, or signal that raw mode is used. In raw mode, the motion vector one or four decision is signaled in the macroblock layer (in the MVMODEBIT element).

The picture header (510) also includes a MVTAB element (560) that indicates which of several variable length code tables are used to decode motion vector data for the frame.

Figure 6:
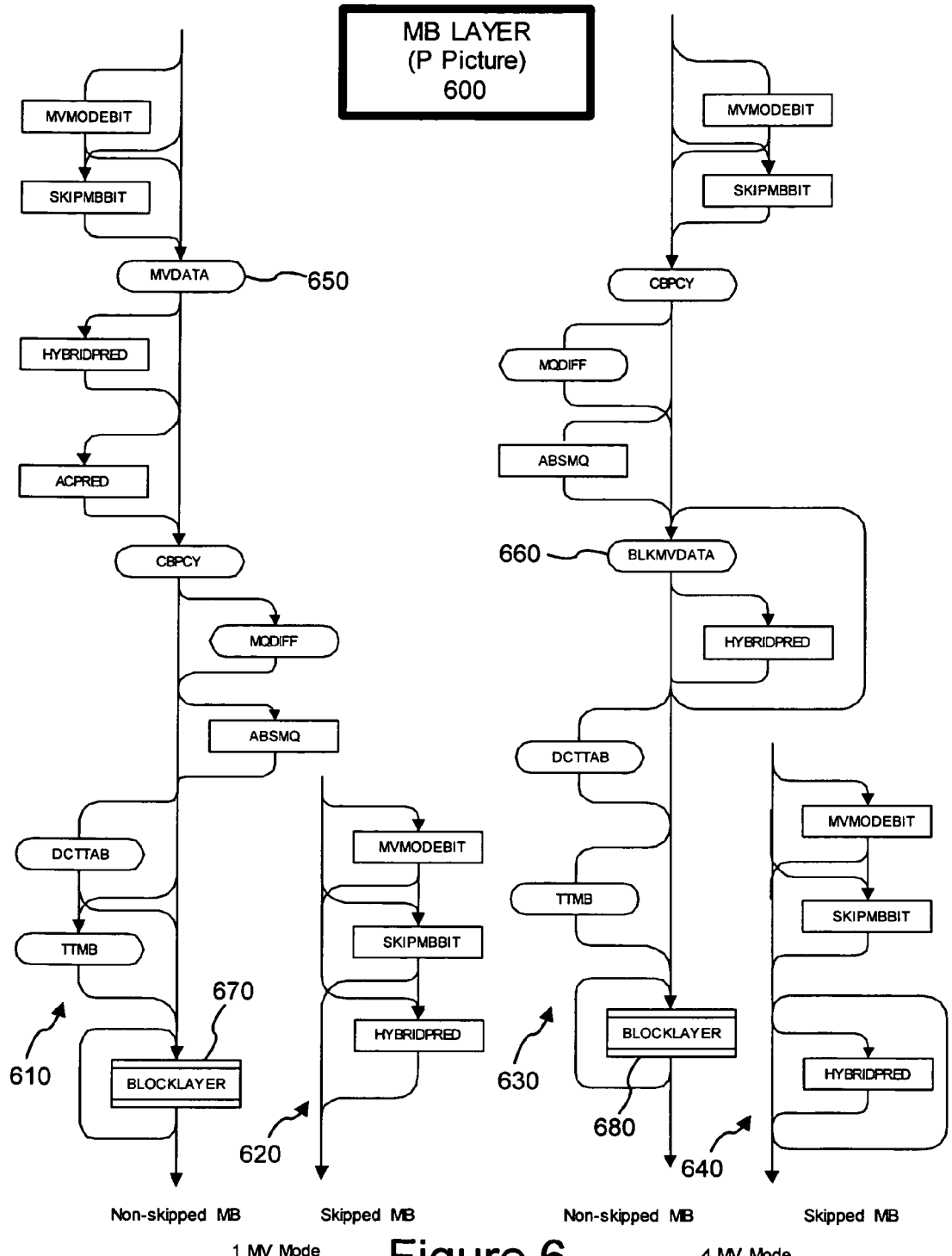
FIG. 6 is a diagram showing a macroblock layer for forward predicted progressive frames of the example bitstream syntax of FIG. 4 with syntax elements for signaling extended motion vector range information.

Referring to FIG. 6, the macroblock layer (600) bitstream syntax for forward predicted progressive frames is illustrated. More specifically, FIG. 6 illustrates four patterns of macroblock headers (depending on the count of motion vectors per macroblock and whether the macroblock is skipped or not). Each pattern includes several elements that are processed by the decoder and used to decode the macroblock. First, the non-skipped 1 MV header (610) is a header for a macroblock that is not skipped and that has one motion vector for the macroblock. Second, the skipped 1 MV header (620) is a header for a "1 MV" macroblock that is skipped. Third, the non-skipped 4 MV header (630) is a header for a macroblock that is not skipped and that has up to four motion vectors for the macroblock, one for each of the four blocks. Fourth, the skipped 4 MV header (640) is a header for a macroblock that is skipped where four motion vectors per macroblock has been signaled.

The non-skipped 1 MV macroblock header (610) includes a MVDATA element (650), and the non-skipped 4 MV macroblock header (630) includes up to four BLKMVDATA elements (660), one for each of the up to four motion vectors for the macroblock. A MVDATA element (650) is associated with all blocks of a 1 MV macroblock, and signals whether the blocks of the 1 MV macroblock are intra or inter type. If the blocks are coded as inter type then the MVDATA element (650) also indicates motion vector differential information.

For the 4 luminance blocks of a 4 MV macroblock, the intra/inter state is signaled by the BLKMVDATA element associated with that block, and the CBPCY element indicates which blocks have BLKMVDATA elements present in the bitstream. To signal motion vector differential information, a MVDATA element (650) or BLKMVDATA element (660) typically includes a variable length codeword followed by one or more fixed length codewords. For some variable length codewords, the value of the variable length codeword determines the size(s) of the fixed length codeword(s) according to a specified table.

The HYBRIDPRED element may be used to signal an alternative motion vector prediction process for the frame.

Other bitstream elements shown in FIGS. 4-6 relate to other aspects of decoding. Also, some or all of the elements described, and extended motion vectors generally in this implementation, may be used in certain functionality profiles for the decoder, but not used for other profiles. For example, they may be used in a complex profile but not a more simple profile.

III. Reconstructing Extended Range Motion Vectors

In motion compensation for a block or macroblock of a current frame, a motion vector is used to locate the predicted block (4 MV mode) or the predicted macroblock for the macroblock (for 1 MV mode) in a reference frame for the current frame. The motion vectors each include horizontal and vertical motion vector components. Those components represent the horizontal and vertical displacements between the block (or macroblock) currently being decoded and the location of the predicted block (or macroblock) in the reference frame.

A decoder such as the decoder (300) of FIG. 3 is preferably able to process motion vectors that are extended beyond the default allowable motion vector range. Such extended range motion vectors may be advantageous, for example, where a similar block in a reference frame is located farther from the current block than can be reached using the default motion vector range. In this situation, extending the allowable motion vector range beyond the default range improves the quality of motion compensation results.

When used in conjunction with the syntax shown in FIGS. 4-6, if the BROADCAST element (420) (see FIG. 4) signals extended motion vectors are possible for the sequence of frames, then the decoder processes the MVRANGE element (530) (see FIG. 5) for a current frame to determine whether extended motion vectors are signaled for the current frame. If the MVRANGE element (530) signals one of the extended motion vector ranges (see Table 1 and Table 2) for the current frame, then the allowable range of motion vectors is extended to accommodate the extended motion vectors. The decoder also ensures that the motion vectors for the current frame are within the extended allowable range, as described below.

In a general, reconstructing each motion vector involves adding a motion vector differential to a motion vector predictor.

A. Motion Vector Prediction Examples

A motion vector predictor for a motion vector is computed from up to three neighboring motion vectors. The neighboring motion vectors considered vary depending on context.

Figures 7A, 7B:
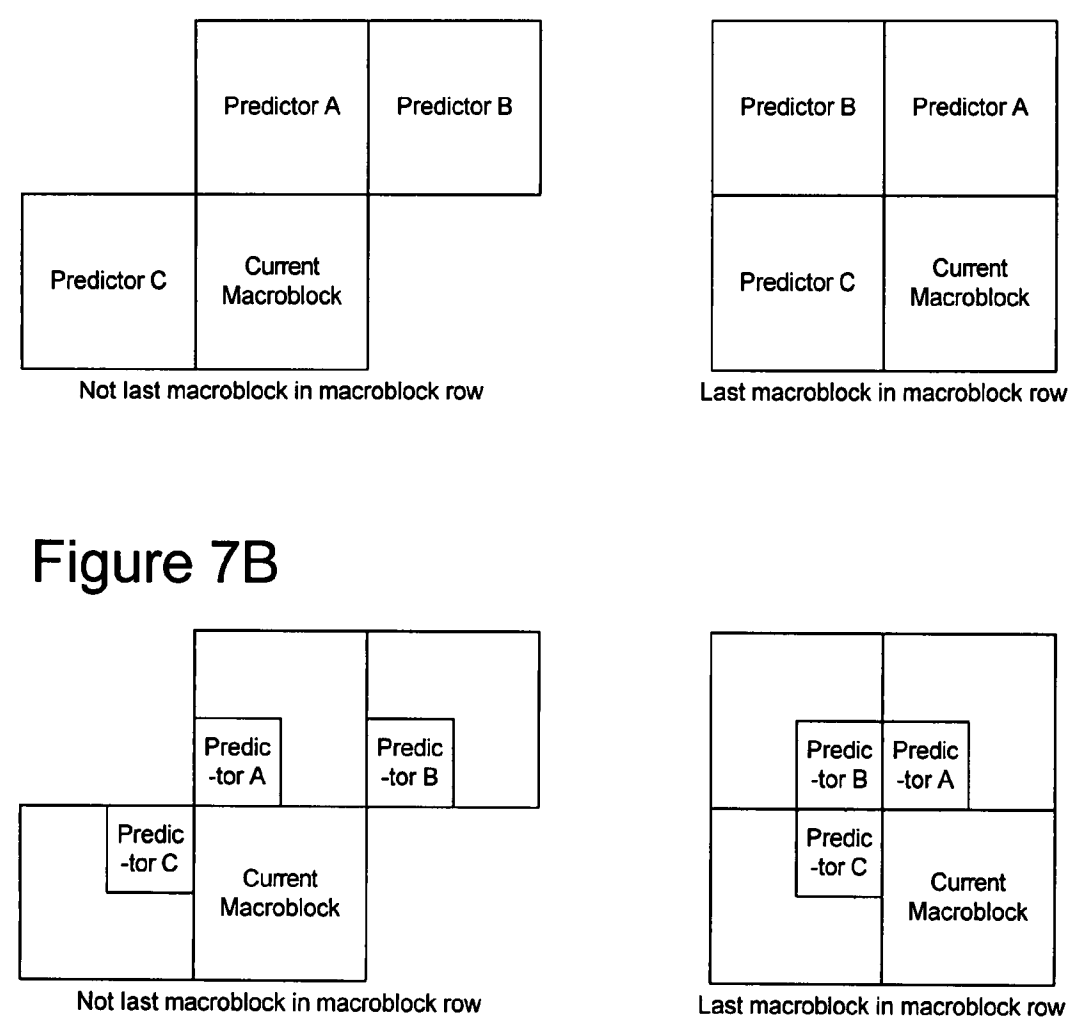

For a 1 MV P-frame (in which the macroblocks are all 1 MV macroblocks), FIG. 7A shows the locations of three neighboring macroblocks A, B, and C whose motion vectors are used to compute the motion vector predictor for the current macroblock. The case where the macroblock is the last macroblock in the row is shown in FIG. 7A. Various other special cases (not shown in FIG. 7A) are addressed in the pseudo code (800) of FIG. 8. For the special case where the frame is one macroblock wide, the motion vector predictor for the current macroblock is always from A.

Figure 7C:
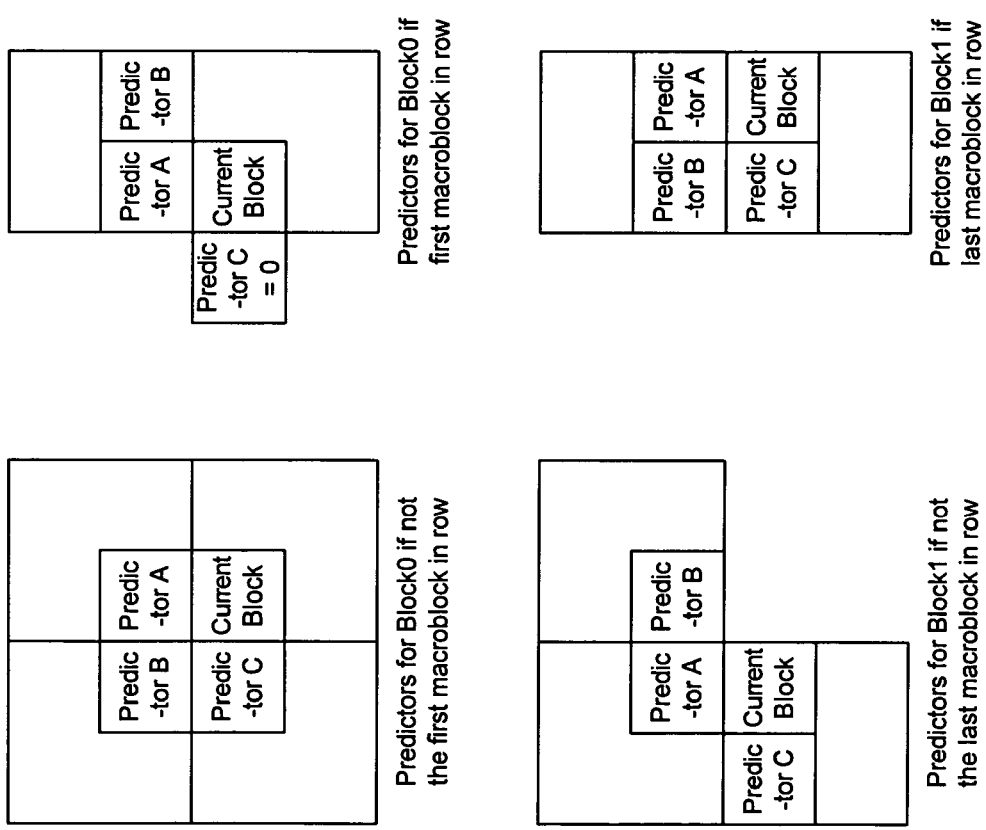

For a mixed-MV P-frame (in which the macroblocks are either 1 MV or 4 MV), FIGS. 7B and 7C show the locations of three neighboring blocks or macroblocks A, B, and C whose motion vectors are used to compute the motion vector predictor for the current block or macroblock. In FIGS. 7B and 7C, the larger squares are macroblock boundaries and the smaller squares are block boundaries. For the special case where the frame is one macroblock wide, the motion vector predictor for the current motion vector is always predictor A. Various other special cases (not shown in FIGS. 7B and 7C) are addressed in the pseudo code (800) of FIG. 8.

Specifically, FIG. 7B shows the neighbors for a current 1 MV macroblock, where the neighboring macroblocks may be 1 MV or 4 MV. FIG. 7B assumes the neighbors are 4 MV. If a neighbor is a 1 MV macroblock, then the predictor for that neighbor is as shown in FIG. 7A for each block of the neighbor. FIG. 7C shows the neighbors for each of the four luminance blocks in a current 4 MV macroblock.

Given up to three motion vector predictor candidates from neighbors as shown in FIGS. 7A-7C, the pseudo code (800) shown in FIG. 8 computes a motion vector predictor for the current block or macroblock. After the motion vector predictor is computed, the decoder checks if the predictor points to an area outside the reference frame. If the area is completely outside the reference frame, the decoder pulls the motion vector predictor back towards the reference frame so that at least one line of the reference frame is inside the block/macroblock referenced by the motion vector predictor.

B. Differential Motion Vector Decoding Examples

With reference to FIG. 6, for a progressive P-frame a 1 MV macroblock may have a single MVDATA (650) element and a 4 MV macroblock may have between zero and four BLKMVDATA (660) elements, where the CBPCY field indicates the number of BLKMVDATA elements for the 4 MV macroblock. Each MVDATA or BLKMVDATA element encodes a horizontal motion vector differential component, a vertical motion vector differential component, and a binary flag indicating whether any transform coefficients are present for the macroblock or block. "Intra" coding is a special case for the horizontal/vertical differential motion vector possibilities. Extended range differential motion vectors are another special case. FIG. 9 illustrates the pseudo code (900) for decoding motion vector differentials as well as information about the presence of transform coefficients. In the index decoding code block (910), the variable length codeword of an MVDATA element (650) or BLKMVDATA element (660) (see FIG. 6) is decoded. This is done using vlc_decode( ), which is a parsing operation that decodes the next variable-length codeword in the bitstream and returns the decoded symbol. Here, vlc_decode( ) uses the variable length code table specified by the picture level MVTAB element (560) (see FIG. 5). The returned value is then assigned to the "index" variable and the index variable is incremented by one.

After the index value is decoded, the decoder performs the operations specified by the "last" determination code block (920) to determine whether the variable length codeword indicates that the macroblock (or block) has no transform coefficients present. The index values discussed below may differ for different implementations. In the implementation below, if the index value (as incremented) is greater than or equal to 37, then the last_flag element is assigned a value of 1, indicating that no coefficients are present. Otherwise, the last_flag=0, indicating at least one coefficient is present.

Additionally, if the index value is greater than or equal to 37, then the index value is decreased by 37 for subsequent processing described below.

The decoder then sets the intra flag element to zero as shown in the set intra_flag code block (930). This indicates that the block is inter-coded, unless the value of intra_flag is subsequently changed as described below.

If the index value (as incremented and possibly reduced by 37) is zero then dmv_x (the horizontal motion vector differential component) and dmv_y (the vertical motion vector differential component) are both set to zero, as illustrated in the zero differential MV decoding code block (940).

As illustrated in the long differential MV decoding code block (950), if the index value is thirty-five, then the differential motion vector is encoded with a special form of coding. Differential motion vectors greater than 159 or less than −159 (in quarter-pixel units), whether used to reconstruct a default range motion vector or an extended range motion vector, are decoded as shown in the long differential MV decoding code block (950). In this case, dmv_x and dmv_y are assigned the values returned by the get_bits (n) operation. The get_bits (n) operation is a bitstream parsing operation that reads n bits from the bitstream and returns the value. Here, it reads the fixed length codeword for dmv_x and returns its value, and then reads the fixed length codeword for dmv_y and returns its value. The length of the dmv_x codeword for long differential motion vectors is k_x-halfpel_flag, and the length of the dmv_y codeword is k_y-halfpel_flag. The value of halfpel_flag is derived from the picture layer MVMODE element 540 (see FIG. 5) (and in some cases related mode elements), and specifies the motion vector resolution for the picture. If halfpel_flag=0 then quarter-pixel precision is used. If halfpel_flag=1 then half-pixel precision is used. The values of k_x and k_y depend on the motion vector range as defined by the MVRANGE element (530) (see FIG. 5) according to Table 3 below.

TABLE 3

| k_x and k_y specified by MVRANGE | | | | |
| --- | --- | --- | --- | --- |
| MVRANGE | k_x | k_y | Range_x | range_y |
| 0 (default) | 9 | 8 | 256 | 128 |
| 10 | 10 | 9 | 512 | 256 |
| 110 | 12 | 10 | 2048 | 512 |
| 111 | 13 | 11 | 4096 | 1024 |

In the intra-coded MV decoding code block (960), if the index value is thirty-six then the intra_flag is set to 1 (indicating that the block is intra-coded), and dmv_x and dmv_y are set to zero.

If the index does not meet the requirements of any of the three preceding "if" and "else if" clauses in code blocks (940), (950), and (960) (i.e., if the index is not equal to zero, thirty-five, or thirty-six (after subtraction of 37 for values that were initially >=37)), then both horizontal and vertical differential motion vector for the macroblock (or block) are in the remaining range (from −158 to 158 in quarter pixel units in most cases). The index indicates the sizes of up to two fixed length codes in the bitstream for the horizontal and vertical components, respectively. The fixed length code is decoded as shown in short differential MV decoding code block (970).

The functions and variables used in short differential MV decoding code block (970) that have not been discussed above are defined as follows:

size_table: An array defined as follows: size_table[6]={0, 2, 3, 4, 5, 8}.

offset_table: An array defined as follows: offset_table[6]
={0, 1, 3, 7, 15, 31}.

/: Arithmetic integer division with truncation towards zero. For example, 7/4 is truncated to 1.

%: Arithmetic modulus operator.

&&: Logical and operator.

&: Bitwise and operator assuming twos complement number representation.

>>: Bitwise right shift with sign extension assuming twos complement number representation.

^: Bitwise XOR operator.

C. Motion Vector Reconstruction Examples

After the motion vector predictors have been computed and the differential motion vector components have been decoded as described above, the luminance (Y) motion vector for the block or macroblock) is reconstructed by adding the differentials to the predictors as follows:

$$mv\_x=(dmv\_x+predictor\_x) \text{smod range\_}x$$

$$mv\_y=(dmv\_y+predictor\_y) \text{smod range\_}y$$

The modulus operation smod is a signed modulus, which may be defined as follows: A smod b=((A+b)%2b)−b. Alternatively, the smod operation can be defined as A smod b=((A+b)&(2b−1))−b when b is a power of 2, which is typically the case of interest. The smod operation ensures that the reconstructed vectors are valid (i.e., in an allowable motion vector range) because A smod b lies within the range of −b and b−1. Thus, mv_x lies within the range of −range_x to range_x−1, and mv_y lies within the range of −range_y to range_y−1. The values of range_x and range_y depend on the value of MVRANGE, as shown in Table 3 above.

The chrominance motion vectors for a macroblock can be derived from the luminance motion vector(s). More specifically, each chrominance motion vector can be reconstructed in two steps. As a first step, the nominal chrominance motion vector is obtained by combining and scaling the luminance motion vector(s) appropriately. The scaling is performed in such a way that half-pixel offsets are preferred over quarter pixel offsets. In the second step, a sequence level 1-bit FASTUVMC element is used to determine if further rounding of chrominance motion vectors is necessary. The purpose of this mode is speed optimization of the decoder. If FASTUVMC=0, no rounding is performed in the second stage. If FASTUVMC=1, the chrominance motion vectors that are at quarter pel offsets will be rounded to the nearest full pel positions.

IV. Example Bitstream Syntax for Progressive B-Frames

Figure 10:
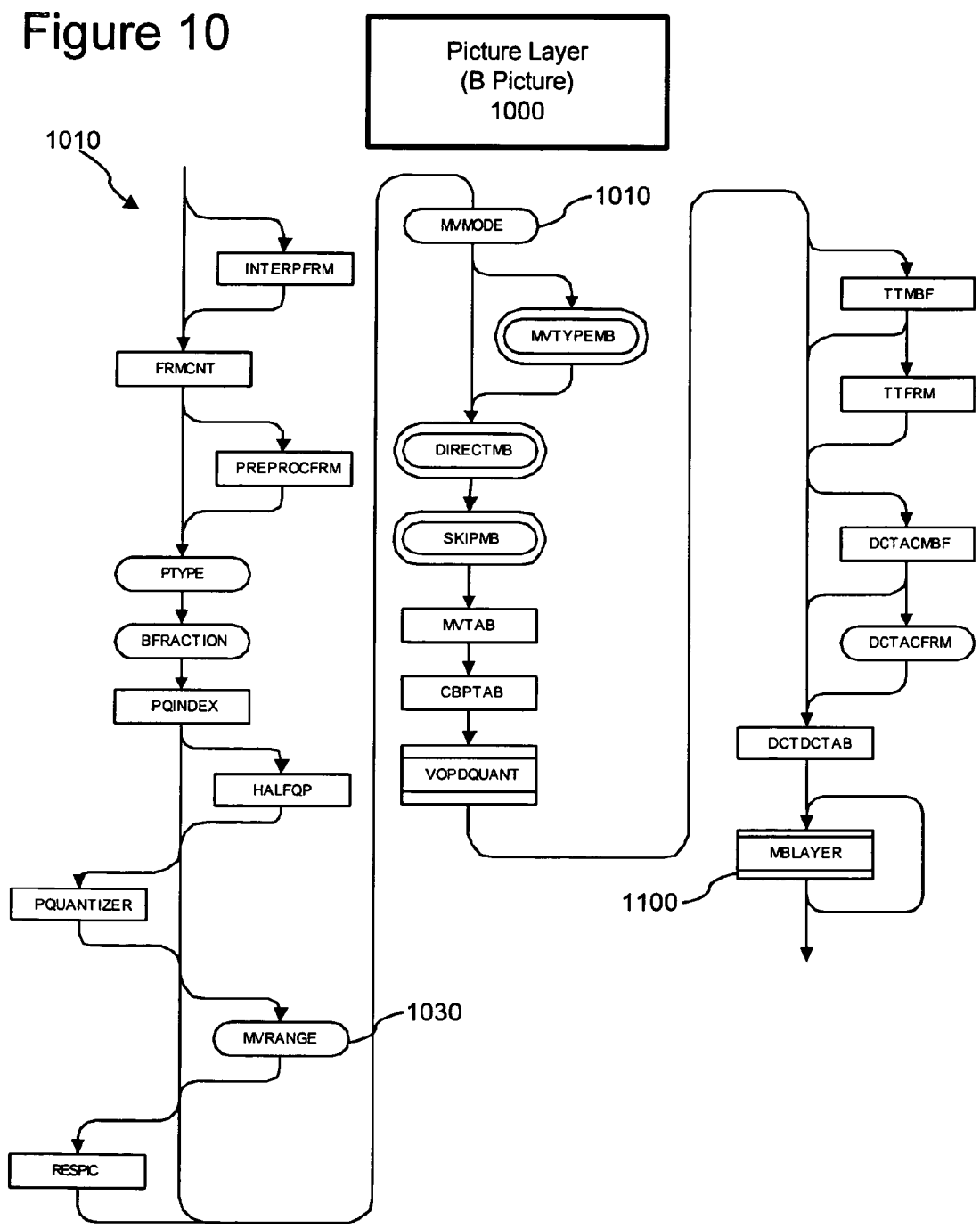
FIG. 10 is a diagram showing a bi-directionally predicted frame layer of the example bitstream syntax of FIG. 4 with syntax elements for signaling extended motion vector range information.

FIG. 10 is a syntax diagram for the picture layer (1000) for a progressive bi-directionally predicted frame. The picture layer (1000) includes a picture header (1010) followed by data for the macroblock layer (1100) (see also FIG. 11). The picture header (1010) includes several picture level elements that are processed by the decoder and used to decode the corresponding compressed B-frame. Some of those elements are only present if their presence is signaled or implied by a sequence level element or a preceding picture level element.

Many of the elements of the picture layer (1000) and macroblock layer (1100) for a progressive B-frame have the same semantic as the corresponding elements for a progressive P-frame (see FIGS. 5 and 6). The picture layer (1000) may include a MVRANGE element (1030) as in progressive P-frames. There are a few differences, however. Unlike progressive P-frames, for example, there is no 4 MV mode for progressive B-frames. The MVMODE element (1010) signals one of two choices: quarter pixel resolution with bicubic interpolation, or half pixel resolution with bilinear interpolation.

Figure 11:
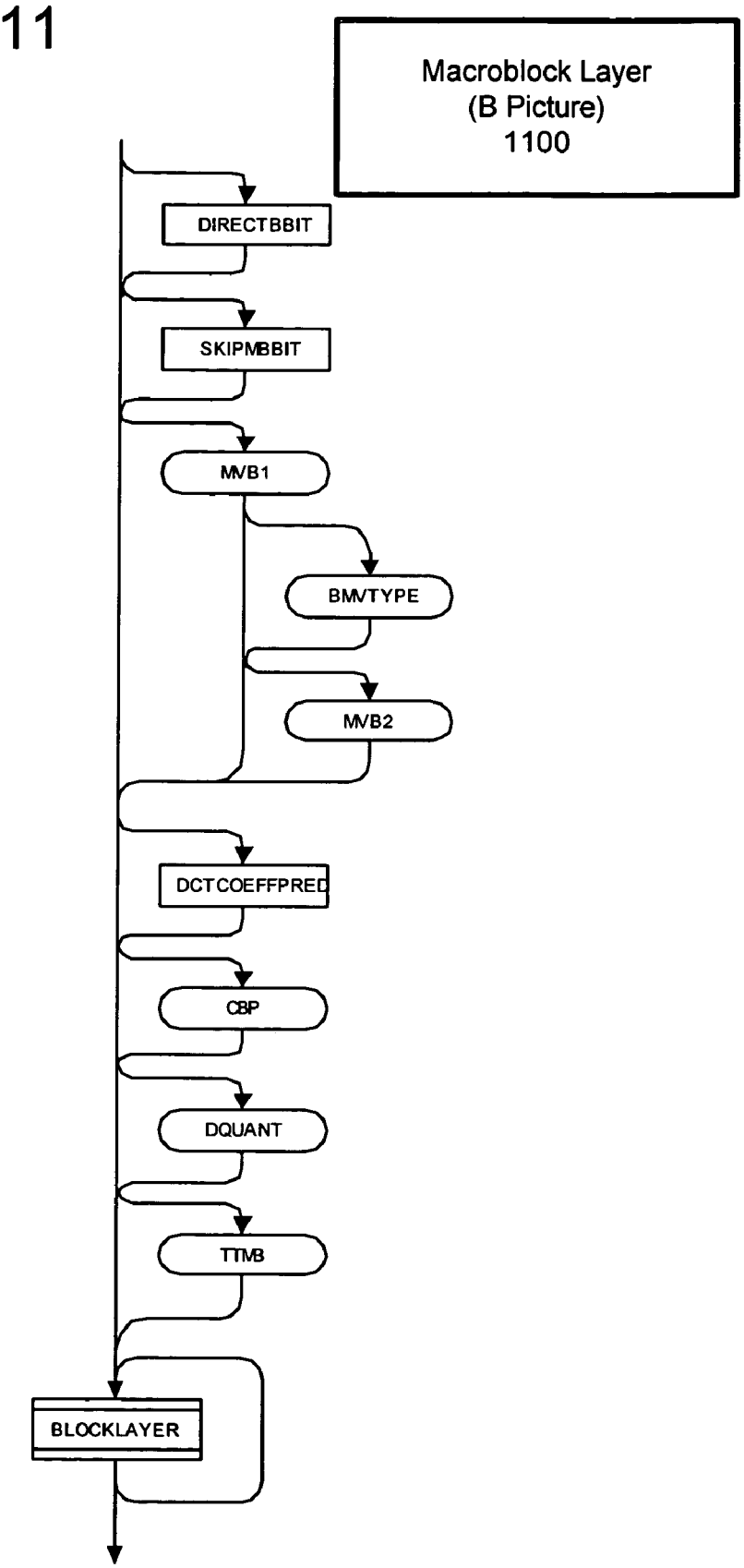
FIG. 11 is a diagram showing a macroblock layer for bi-directionally predicted progressive frames of the example bitstream syntax of FIG. 4 with syntax elements for signaling extended motion vector range information.

FIG. 11 is a syntax diagram for macroblock layer (1100) for progressive bi-directionally predicted frames. The macroblock layer (1100) includes several elements specific to progressive B-frame macroblocks. The BMV1 and BMV2 elements signal motion vector data for up to two motion vectors for a macroblock. Other elements signal prediction direction (forward, backward, direct, or interpolated). Forward and backward macroblocks may have one associated differential motion vector (with horizontal and vertical components). Interpolated macroblocks may have up to two associated differential motion vectors (each with horizontal and vertical components). As to signaling for extended range motion vectors, motion vector prediction, and differential motion vector decoding, the mechanisms are basically as described above for progressive P-frames (see, e.g., FIGS. 8 and 9), aside from some differences with respect to preparation for subsequent motion vector prediction.

Having described and illustrated the principles of our invention, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

I claim:

1. A computer-implemented method of using a video decoder to transform video from a compressed form to a reconstructed form, the method comprising:

receiving, at the video decoder, encoded data in a bit stream for a video sequence; and with the video decoder, decoding a picture in the video sequence using the encoded data, including:

with the video decoder, decoding a variable length code indicating a motion vector range for a current frame, wherein the indicated motion vector range is selected from among plural extended ranges and a default range each represented with an associated variable length code in a variable length code table; and with the video decoder, reconstructing one or more motion vectors for blocks and/or macroblocks of the current frame based at least in part on the indicated motion vector range for the current frame, wherein the reconstructing comprises, for a motion vector component (mv), combining a motion vector differential component (dmv) with a motion vector predictor component (predictor) as follows:

$$mv=(dmv+predictor) \text{smod } b;$$

wherein the indicated motion vector range is from −b to b−1, and wherein smod is a signed modulus operation that assures mv is within the indicated motion vector range.

2. The method of claim 1, wherein each of the plural extended ranges has exact horizontal and vertical limits for the range.

3. The method of claim 1, further comprising:

with the video decoder, processing a sequence level syntax element that indicates one or more picture level syntax elements are present for one or more frames of the sequence including the current frame;

with the video decoder, processing a picture level syntax element including the variable length code indicating the motion vector range for the current frame.

4. The method of claim 3, wherein the sequence level syntax element comprises an element in a sequence header for the bitstream.

5. The method of claim 4, wherein the picture level syntax element comprises an element in a frame header for the current frame.

6. The method of claim 1, wherein the indicated motion vector range for the current frame comprises an allowable horizontal range and an allowable vertical range.

7. The method of claim 1, wherein the indicated motion vector range is one of the plural extended ranges, and wherein the reconstructing comprises processing a first motion vector of the one or more motion vectors for the current frame that extends outside the default range.

8. The method of claim 7, wherein processing the first motion vector comprises using the value of the indicated motion vector range to anticipate how many bits represent a differential component of the first motion vector and processing the bits.

9. A computer-implemented method of using a video decoder to transform video from a compressed form to a reconstructed form, the method comprising:

receiving, at the video decoder, encoded data in a bit stream for a video sequence; and with the video decoder, decoding a picture in the video sequence using the encoded data, including:

with the video decoder, choosing a motion vector range from among multiple available motion vector ranges; and with the video decoder, reconstructing a motion vector, including computing a signed modulus by a factor that varies depending on the chosen motion vector range, wherein the reconstructing comprises combining a motion vector differential component (dmv) with a motion vector predictor component (predictor) as follows:

$mv = (dmv + predictor) \text{ smod } b;$ wherein mv represents a motion vector component for the motion vector, smod represents the signed modulus, and b represents a component motion vector range factor for the chosen motion vector range.

10. The method of claim 9, wherein the multiple available motion vector ranges include a default range and a plurality of extended ranges that are larger than the default range.

11. The method of claim 9, wherein the motion vector differential component is a horizontal differential component (dmv_x), the motion vector predictor component is a horizontal predictor component (predictor_x), the motion vector component is a horizontal motion vector component (mv_x), and the component motion vector range factor indicates a horizontal motion vector range $(-b_{\_x} \text{ to } b_{\_x}-1)$.

12. The method of claim 9, wherein the choosing comprises processing a sequence level syntax element relating to motion vector range and a frame level syntax element relating to motion vector range.

13. The method of claim 12, wherein the sequence level syntax element comprises an element in a sequence header for a bitstream and the frame level syntax element comprises an element in a picture header for a current frame.

14. A computer-implemented method of using a video decoder to transform video from a compressed form to a reconstructed form, the method comprising:

with the video decoder, parsing a sequence layer syntax element that indicates whether extended range motion vectors are possible for a sequence of frames;

if the sequence layer syntax element indicates that extended range motion vectors are possible for the sequence of frames, then with the video decoder performing additional processing that allows the use of extended range motion vectors for the sequence of frames, wherein the additional processing comprises:

with the video decoder, parsing a picture level syntax element that indicates whether an allowable motion vector range for a current frame is a default range for the sequence of frames or a larger extended range; and with the video decoder, performing a signed modulus operation to compute a motion vector for a macroblock or block of the current frame as follows:

$mv\_x = (dmv\_x + predictor\_x) \text{ smod range}\_x$ $mv\_y = (dmv\_y + predictor\_y) \text{ smod range}\_y$ if the sequence layer syntax element indicates that extended range motion vectors are not possible for the sequence of frames, then with the video decoder skipping the additional processing that allows the use of extended range motion vectors for the sequence of frames.

15. The method of claim 14, wherein the picture level syntax element is a variable length code indicating the default range or one of plural available extended ranges.

* * * * *

UNITED STATES PATENT AND TRADEMARK OFFICE
CERTIFICATE OF CORRECTION

PATENT NO. : 7,499,495 B2
APPLICATION NO. : 10/893703
DATED : March 3, 2009
INVENTOR(S) : Sridhar Srinivasan It is certified that error appears in the above-identified patent and that said Letters Patent is hereby corrected as shown below:

In column 18, line 7, in Claim 11, delete "$(-b_{-x\ to\ b_{-}x-1})$." and insert -- $(-b\_x\ to\ b\_x-1)$. --, therefor.

In column 18, line 36, in Claim 14, after "mv_y=(dmv_y+predictor_y)smod range_y" insert -- ; and --.

Signed and Sealed this
Nineteenth Day of April, 2011

David J. Kappos
*Director of the United States Patent and Trademark Office*